United States Patent
Pickett et al.

(10) Patent No.: US 11,555,371 B2
(45) Date of Patent: Jan. 17, 2023

(54) VALVE HAVING PROTECTED, MOVEABLE SEAL AND SEAL ASSEMBLY THEREFOR

(71) Applicant: National Oilwell Varco, L.P., Houston, TX (US)

(72) Inventors: Geoffrey A. Pickett, Sugar Land, TX (US); Matthew Albert Franchek, Houston, TX (US); Seyed Mohammad Parvasi, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 445 days.

(21) Appl. No.: 16/609,241

(22) PCT Filed: Apr. 27, 2018

(86) PCT No.: PCT/US2018/029969
§ 371 (c)(1),
(2) Date: Oct. 29, 2019

(87) PCT Pub. No.: WO2018/204197
PCT Pub. Date: Nov. 8, 2018

(65) Prior Publication Data
US 2020/0182005 A1 Jun. 11, 2020

Related U.S. Application Data

(60) Provisional application No. 62/501,606, filed on May 4, 2017.

(51) Int. Cl.
*F16K 3/18* (2006.01)
*E21B 33/06* (2006.01)
(Continued)

(52) U.S. Cl.
CPC .......... *E21B 33/062* (2013.01); *F16J 15/021* (2013.01); *F16K 3/0227* (2013.01); *F16K 3/18* (2013.01); *F16K 3/186* (2013.01); *F16K 3/0281* (2013.01)

(58) Field of Classification Search
CPC .......... F16K 3/0227; F16K 3/18; F16K 3/184; F16K 3/186; F16K 3/0281; E21B 33/062;
(Continued)

(56) References Cited

U.S. PATENT DOCUMENTS 2,194,255 A * 3/1940 Allen ..................... E21B 33/062
251/1.3
2,194,257 A * 3/1940 Allen ..................... E21B 33/062
251/356
(Continued)

FOREIGN PATENT DOCUMENTS

EP        0140490 B1 *  9/1988
WO    2017/039842 A1     3/2017

OTHER PUBLICATIONS

International Patent Application No. PCT/US2018/029969 Search Report and Written Opinion dated Sep. 14, 2018 (18 pages).
(Continued)

*Primary Examiner* — David Colon-Morales
(74) *Attorney, Agent, or Firm* — Conley Rose, P.C.

(57) ABSTRACT

A sealing apparatus includes a moveable seal holder with a cavity and includes a seal assembly disposed at least partially in the cavity. The seal assembly includes a resilient seal member including a fluid-facing end with a fluid-facing end surface, and the seal assembly includes an actuator plate configured to reciprocate between a first and a second position relative to the protective plate. The first actuator plate includes a fluid-facing end surface and a first camming surface. The seal assembly further includes a first protective plate disposed between the seal member and the first actua-
(Continued)

tor plate. The actuator plate is configured to compress the seal member and to move the fluid-facing end surface of the seal member outward from a resting position when the actuator plate is in the second position.

27 Claims, 12 Drawing Sheets

(51) Int. Cl.
*F16J 15/02* (2006.01)
*F16K 3/02* (2006.01)

(58) Field of Classification Search
CPC ..... E21B 33/063; E21B 33/061; F16J 15/021; F16J 15/32
See application file for complete search history.

(56) References Cited

U.S. PATENT DOCUMENTS

| | | | | |
|---|---|---|---|---|
| 2,194,259 A * | 3/1940 | Allen | ............... | E21B 33/062 251/1.3 |
| 2,218,093 A * | 10/1940 | Penick | ............... | E21B 33/062 251/212 |
| 2,318,882 A * | 5/1943 | Nevill | ............... | E21B 33/062 277/325 |
| 2,593,793 A | 4/1952 | Rector | | |
| 2,749,078 A * | 6/1956 | Losey | ............... | E21B 33/062 277/325 |
| 3,023,994 A * | 3/1962 | Gibson | ............... | E21B 33/062 251/1.3 |
| 3,102,709 A * | 9/1963 | Allen | ............... | E21B 33/062 251/210 |
| 4,444,404 A * | 4/1984 | Parks, Jr. | ............... | E21B 33/062 251/1.2 |
| 4,456,215 A * | 6/1984 | Bishop | ............... | E21B 33/062 251/1.2 |
| 4,638,972 A * | 1/1987 | Jones | ............... | E21B 33/062 251/1.3 |
| 6,394,460 B1 * | 5/2002 | Leggett | ............... | E21B 33/062 277/343 |
| 9,238,950 B2 * | 1/2016 | Schaeper | ............... | E21B 33/062 |
| 9,708,876 B2 * | 7/2017 | Painter | ............... | E21B 33/062 |
| 2006/0113501 A1 * | 6/2006 | Isaacks | ............... | E21B 33/063 251/1.1 |
| 2015/0184481 A1 * | 7/2015 | Painter | ............... | E21B 33/062 251/1.3 |
| 2015/0198003 A1 * | 7/2015 | Schaeper | ............... | E21B 33/062 251/1.3 |
| 2017/0058625 A1 * | 3/2017 | Araujo | ............... | E21B 33/062 |
| 2017/0067308 A1 * | 3/2017 | Holland, Jr. | ............... | E21B 33/063 |

OTHER PUBLICATIONS

European Patent Application No. 18794922.7 extended European search report dated Nov. 20, 2020 (9 pages).
GCC Patent Application No. GC 2018-35240 Examination Report dated Jan. 12, 2020 (5 pages).
European Office Action dated May 24, 2022, for Application No. EP 18794922.7.

* cited by examiner

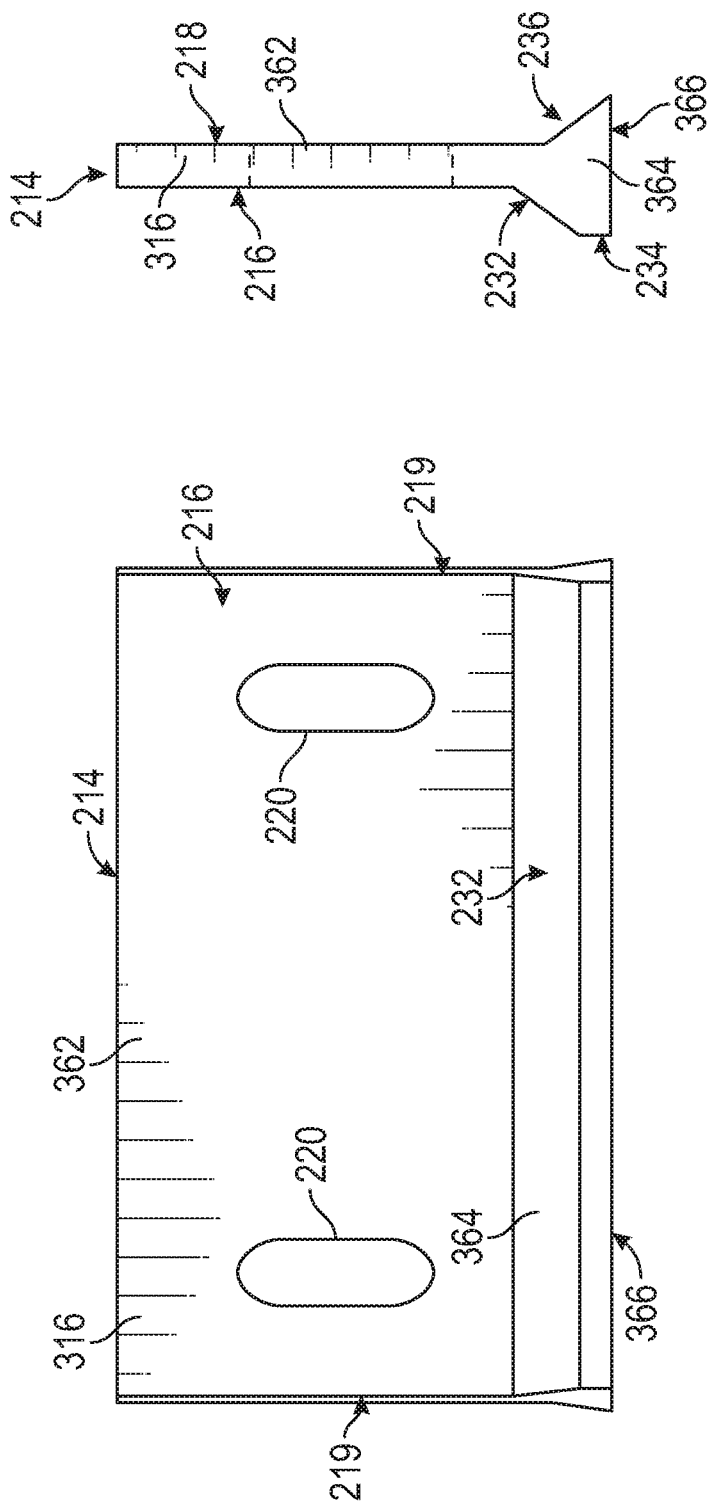

VALVE HAVING PROTECTED, MOVEABLE SEAL AND SEAL ASSEMBLY THEREFOR

CROSS REFERENCE TO RELATED APPLICATIONS

This application is a 35 U.S.C. § 371 national stage entry of PCT/US2018/029969, filed Apr. 27, 2018, entitled "Valve Having Protected, Moveable Seal and Seal Assembly Therefor," which claims the benefit of US Provisional Application No. 62/501,606, filed May 4, 2017, entitled "Valve Having Protected, Moveable Seal and Seal Assembly Therefor," the entire contents of each being hereby incorporated by reference herein for all purposes.

BACKGROUND

Field of the Disclosure

This disclosure relates generally to valves with linearly moving plates configured to close flow passages, including annular flow passages. More particularly, it relates to an apparatus and methods for sealing with moving seal assemblies having a resilient seal member. Still more particularly, this disclosure relates to blow-out preventers, ram valves, gate valves, and similar equipment suitable for high pressure applications.

Background to the Disclosure

Blow-out preventers (BOP's) and ram valves may be used to close rapidly a flow passage so as to prevent an unexpected surge in pressure from causing an uncontrolled flow of fluid out of an oil well (i.e. a well blowout). Considering BOP's more closely, BOP's commonly include a linearly moving plate or plates having a resilient seal member extending from its leading end. Some plates are contoured to seal the annular space around a tubular member that extends through the BOP valve. Whether the plates have a flat or a contoured leading end, during normal operation the plates are retracted from a flow passage but the seal member remains exposed to the fluid that is flowing through the passage. When the fluid includes entrained, abrasive particles, the normal flow through the valve can result in erosion of the seal member, making the valve less effective or ineffective for the purpose of closing and sealing the fluid passage when the valve is activated to close.

SUMMARY OF THE DISCLOSED EMBODIMENTS

These and other needs in the art are addressed in one embodiment by a sealing apparatus. In an embodiment, the sealing apparatus includes a moveable seal holder, a cavity in the seal holder, and a seal assembly disposed at least partially in the cavity. The seal assembly includes a resilient seal member including a fluid-facing end with a fluid-facing end surface. The seal assembly also includes a first actuator plate configured to reciprocate between a first and a second position relative to the protective plate. The first actuator plate includes a fluid-facing end surface and a first camming surface. In addition, the seal assembly includes a first protective plate disposed between the seal member and the first actuator plate. The actuator plate is configured to compress the seal member and to move the fluid-facing end surface of the seal member outward from a resting position when the actuator plate is in the second position.

In some embodiments, the seal assembly is configured such that movement of the first actuator plate from the first position toward the second position causes the first camming surface of the first actuator plate to bear against the first protective plate and to compress the resilient seal member. In some embodiments, the seal assembly is configured such that when the first actuator plate is in the first position, the thickness of the resilient seal member at the fluid-facing end has a first thickness, and when the actuator plate is in the second position, the thickness of the resilient seal member at the fluid-facing end has a second thickness that is less than the first thickness.

In some embodiments, the cavity in the seal holder includes opposing, first and second receiving surfaces, the seal assembly is disposed between the first and second receiving surfaces, and the first actuator plate further comprises a second camming surface configured to engage the first receiving surface of the cavity as the first actuator plate is moved from the first position toward the second position. In some embodiments, the fluid-facing end of resilient seal member has curved recess configured to seal against a cylindrical pipe. In some embodiments, the fluid-facing end surface of resilient seal member is concave when the first actuator plate is in the first position, and the fluid-facing surface end of resilient seal member is convex when the first actuator plate is in the second position.

In some embodiments, the first position of the first actuator plate, the fluid-facing end surface of the first actuator plate extends beyond the fluid-facing end surface of the seal member, and, in the second position of the first actuator plate, the fluid-facing end surface of the seal member extends to or beyond the fluid-facing end surface of the first actuator plate.

In some embodiments, the seal assembly further comprises a plurality of pins, each of the pins extending into a receiving slot that limits the distance the first actuator plate may travel. In some embodiments, the pins extend from the first actuator plate and the slots are formed in the first protective plate, and the protective plate is bonded to the seal member. In some embodiments, the first actuator plate further comprises a body portion that is free of camming surfaces and a wedge portion extending from the body portion to the fluid-facing end surface of the first actuator plate and including the first camming surface. In some embodiments, the slots have a functional length through which the pins can move, and the functional length of the slots is less than the camming length.

In some embodiments, the sealing apparatus further comprises a valve body having a fluid passageway therethrough, and a seat in the valve body configured to engage sealingly the seal member of the moveable seal holder. In some of these embodiments, the moveable seal holder is configured to move from an open position in which the resilient seal member is spaced apart from the seat to a closed position in which the resilient seal member sealingly engages the seat to prevent fluid flow through the body.

In some embodiments, the fluid-facing end of resilient seal member has curved recess configured to seal against a cylindrical pipe, and the sealing apparatus further comprises a BOP body having an interior surface defining a fluid passageway and being configured to receive a tubular member having a given diameter extending through the passageway. The moveable seal holder is disposed within the BOP body and is configured to move from an open position in which the resilient seal member is spaced apart from the tubular member to a closed position in which the curved recess of the resilient seal member configured to engage sealingly a tubular member of the given diameter to prevent fluid flow through the BOP.

In some embodiments, the seal assembly further comprises a second protective plate comprising a camming surface and a second protective plate disposed between the seal member and the second actuator plate. In these embodiments, the cavity in the seal holder includes opposing, first and second receiving surfaces, and the seal assembly is disposed between the first and second receiving surfaces. Further, the seal assembly is configured such that movement of the second actuator plate from a first position toward a second position causes the camming surface of the second actuator plate to compress the resilient seal member by bearing against the second protective plate or against the second receiving surface of the cavity.

These and other needs in the art are addressed in yet another embodiment by a method for sealing a fluid passageway. The method includes disposing a resilient seal member within a seal holder, the seal member extending parallel to a first axis, the seal member having a fluid-facing end surface with a resting position. The method also includes, configuring a first actuator plate to move relative to the seal member and the seal holder. In addition the method includes, compressing the seal by moving the first actuator plate and causing the fluid-facing end surface of the seal member to extend outward along the first axis, beyond the seal holder and beyond the resting position.

In some embodiments of the method, moving the first actuator plate involves moving it parallel to the first axis. In some embodiments of the method, the first actuator plate is configured to apply to the seal member a compression force parallel to or along a second axis that crosses the first axis.

In some embodiments of the method, compressing the seal member by moving the first actuator plate includes applying an actuation force parallel to the first axis. In some embodiments of the method, the seal holder is disposed within a valve body having a flow passageway, and the seal holder is configured for movement along the first axis relative to the valve body. In some embodiments of the method, causing the fluid-facing end surface of the seal member to extend outward results in closing the flow passageway.

In some embodiments, the method also includes disposing the first actuator plate within the seal holder along a first surface of the seal member, and disposing a second actuator plate within the seal holder along a second surface of the seal member. The first and second surfaces of the seal member are parallel to the first axis; and compressing the seal includes moving both actuator plates relative to the seal member, parallel to the first axis.

Thus, embodiments described herein include a combination of features and characteristics intended to address various shortcomings associated with certain prior devices, systems, and methods. The various features and characteristics described above, as well as others, will be readily apparent to those of ordinary skill in the art upon reading the following detailed description, and by referring to the accompanying drawings.

BRIEF DESCRIPTION OF THE DRAWINGS

For a detailed description of the disclosed exemplary embodiments, reference will now be made to the accompanying drawings:

FIGS. 16 and 17 show two standard views of the actuator of the ram in FIG. 14;

NOTATION AND NOMENCLATURE

Figure 1:
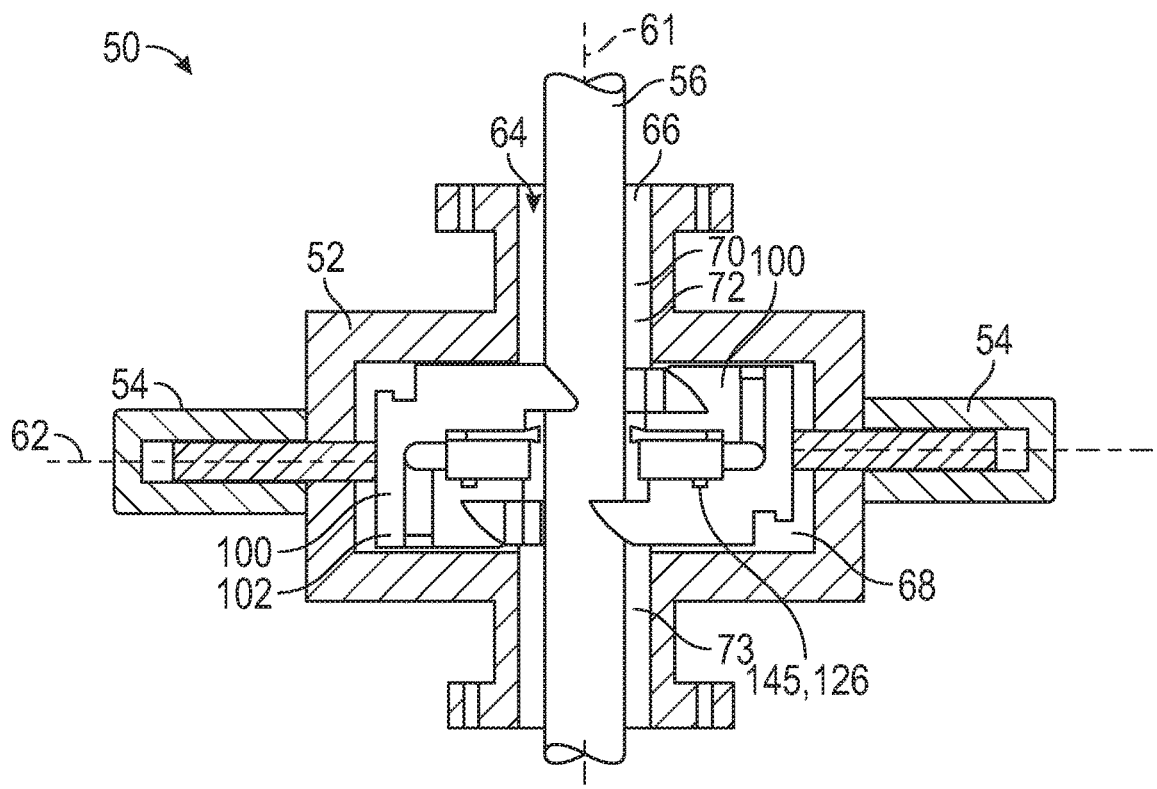
FIG. 1 shows a side view, partially in cross-section, of an embodiment of a sealing apparatus having multiple rams configured as a moveable seal holders in accordance with principles described herein.

The following description is exemplary of certain embodiments of the disclosure. One of ordinary skill in the art will understand that the following description has broad application, and the discussion of any embodiment is meant to be exemplary of that embodiment, and is not intended to suggest in any way that the scope of the disclosure, including the claims, is limited to that embodiment.

The figures are not necessarily drawn to-scale. Certain features and components disclosed herein may be shown exaggerated in scale or in somewhat schematic form, and some details of conventional elements may not be shown in the interest of clarity and conciseness. In some of the figures, in order to improve clarity and conciseness, one or more components or aspects of a component may be omitted or may not have reference numerals identifying the features or components. In addition, within the specification, including the drawings, like or identical reference numerals may be used to identify common or similar elements.

As used herein, including in the claims, the terms "including" and "comprising," as well as derivations of these, are used in an open-ended fashion, and thus are to be interpreted to mean "including, but not limited to . . . ." Also, the term "couple" or "couples" means either an indirect or direct connection. Thus, if a first component couples or is coupled to a second component, the connection between the components may be through a direct engagement of the two components, or through an indirect connection that is accomplished via other intermediate components, devices and/or connections. The recitation "based on" means "based at least in part on." Therefore, if X is based on Y, then X may be based on Y and on any number of other factors. The word "or" is used in an inclusive manner. For example, "A or B" means any of the following: "A" alone, "B" alone, or both "A" and "B."

In addition, when used herein including the claims, the words "generally" and "substantially" mean within a range of plus or minus 10%. When used herein, including the claims, the word "uniform" is equivalent to the phrase "uniform or substantially uniform."

In addition, the terms "axial" and "axially" generally mean along a given axis, while the terms "radial" and "radially" generally mean perpendicular to the axis. For instance, an axial distance refers to a distance measured along or parallel to a given axis, and a radial distance means a distance measured perpendicular to the axis. Furthermore, any reference to a relative direction or relative position is made for purpose of clarity, with examples including "top," "bottom," "up," "upper," "upward," "down," "lower," "clockwise," "left," "leftward," "right," and "right-hand." For example, a relative direction or a relative position of an object or feature may pertain to the orientation as shown in a figure or as described. If the object or feature were viewed from another orientation or were implemented in another orientation, it may be appropriate to describe the direction or position using an alternate term.

DETAILED DESCRIPTION OF THE DISCLOSED EXEMPLARY EMBODIMENTS

The following discussion describes various embodiments of a sealing apparatus that compresses a sealing member to move or extend a fluid-facing end surface of the sealing member in order to close a fluid passage. Compressing the sealing member pushes a portion of its body toward its fluid-facing end surface and into the fluid passage. When the seal member is relaxed and the valve is open, that portion of the seal member's body is retracted from the fluid passageway and thereby protected from fluid flow. In some embodiments, the fluid-facing end surface or a portion of it is also retracted from the fluid passageway and is thereby protected from the fluid flow when the seal member is relaxed and the valve is open. In some instances, an embodiment of the sealing apparatus is used for safety or process control at a hydrocarbon well, including situations that require a high-speed closure of a fluid passageway. Embodiments of the sealing apparatus may, in other instances, be employed in gate valves, such as valves controlling the flow of fluid of various types in pipelines, refineries or other industrial facilities.

Referring to FIG. 1, in an exemplary embodiment, a valve 50, a sealing apparatus, includes a valve body 52, multiple rams 100, and multiple hydraulic piston-cylinder assemblies 54, each is configured to apply an actuation force parallel to a ram axis 62 to actuate one of the rams 100. In this example, valve 50 is configured as a blow-out-preventer (BOP) suitable for use at the wellhead of a hydrocarbon well and includes two rams 100. In some applications, multiple BOP valves 50 will be used in series at a wellhead of an oil well during drilling, production, maintenance, or other well operations. BOP valve 50 is configured to allow a tubular member or strings of tubular members, such as pipe 56 to be installed into, retained within, or be removed from the oil well. In various instances for various embodiments, the tubular member or string may include, as examples, a bottom hole assembly, drill pipe, casing, or coiled tubing.

Valve body 52, which may also be called a BOP body, includes a flow axis 61, the ram axis 62 perpendicular to flow axis 61, and an interior surface 64. Interior surface 64 includes a flow channel 66, which is a throughbore passing entirely through body 52 along flow axis 61, and a cylindrical actuator recess or channel 68 extending along ram axis 62 and intersecting channel 66. The rams 100 are slidingly received within channel 68 on opposite sides of axis 61. When installed as shown, pipe 56 extends entirely through channel 66, generally centered on axis 61 and passing between rams 100. An annular fluid passageway 70 surrounds pipe 56, providing a path for fluid communication through valve 50 and into a well or well bore. The positioning of the rams 100 within body 52 divides flow channel 66 and, more specifically, divides annular passageway 70 into an upper fluid zone 72 and a lower fluid zone 73. Valve 50 is configured to close and to open fluid communication between annular zones 72, 73 by sliding rams 100 along ram axis 62 toward or away from each other and pipe 56. Valve 50 is shown in an open condition with rams 100 retracted to a position away-from flow axis 6. Rams 100 are configured to seal simultaneously against each other and against the outer surface of pipe 56 or another tubular member when closed around it.

Figure 2:
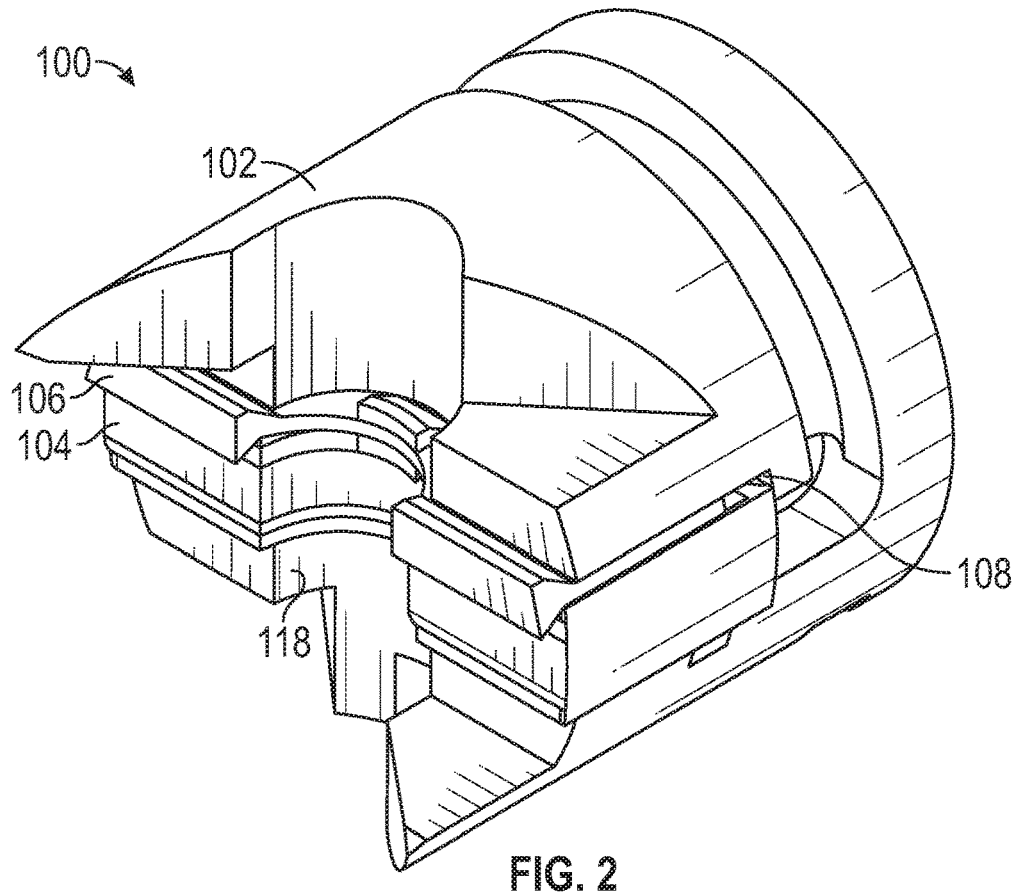
FIG. 2 shows a perspective view of a ram of FIG. 1.

Referring now to FIG. 1 and FIG. 2, ram 100 is a sealing apparatus and is configured as an assembly that includes a ram body 102 as well as a seal 104 and an actuator 106, both of which extend out from a channel or cavity 108 in ram body 102. Ram body 102 is therefore configured as a moveable seal holder. Seal 104 and actuator 106 may be configured as an assembly. Ram 100 also includes a generally semi-circular recess or channel 118 passing through ram body 102, seal 104, and actuator 106. The inclusion of semi-circular channel 118 configures ram 100 as a pipe ram capable of sealing the annular flow passageway 70 located around pipe 56 or any of a variety of tubular members. Actuator 106 extends further out of cavity 108 than does seal 104 when disposed in the resting position that is shown, the resting position corresponding to the open condition of valve 50. In the examples of FIGS. 1 and 2, seal 104 is configured as a plate-backed seal.

Figure 3:
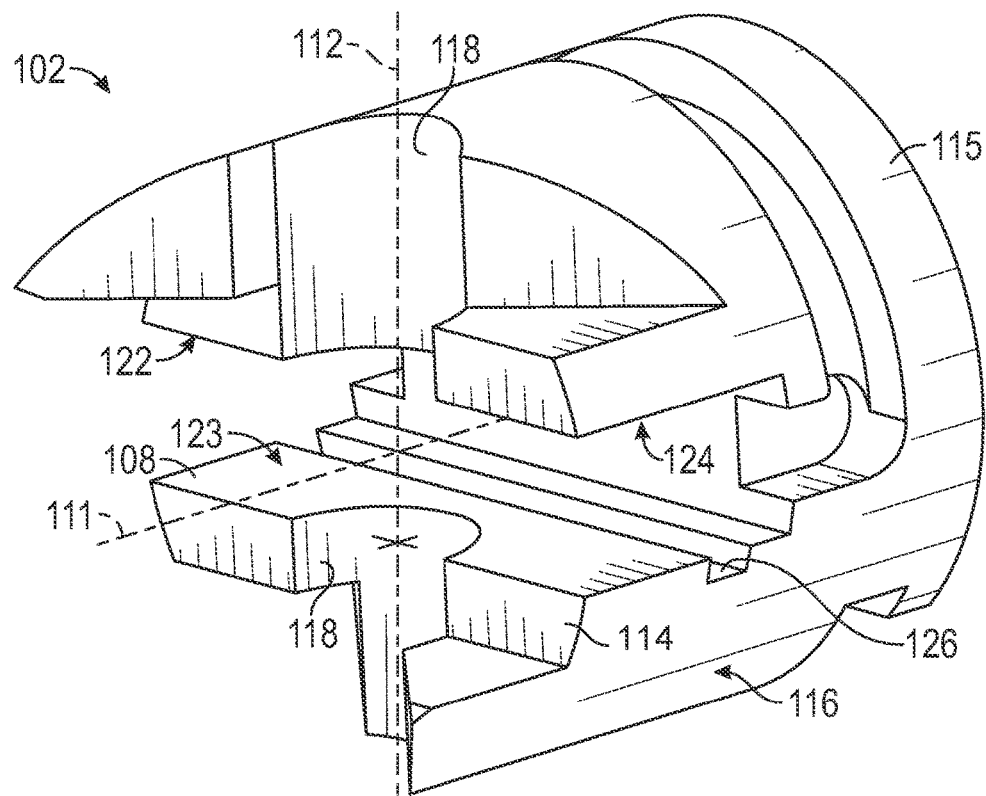
FIG. 3 shows a perspective view of the ram body of FIG. 2.

Best shown in FIG. 3, ram body 102 is generally cylindrical and includes a central or longitudinal ram axis 111, a transverse axis 112, a front end 114, a back end 115, a generally cylindrical outer surface 116, the cavity 108, and semi-circular portions of channel 118 centered along axis 112. Transverse axis 112 is located at front end 114 and intersects axis 111 at 90 degrees. Cavity 108 is generally rectangular, extending through front end 114 depth wise along axis 111 and extending laterally in width through outer surface 116 at two opposite locations. Cavity 108 includes an upper receiving surface 122, a lower receiving surface 123, a rear surface 124, and a keyway 126 located in lower surface 123. Surfaces 122, 123 oppose each other, extend parallel to axis 111, are perpendicular to transverse axis 112.

Lengthwise, keyway 126 is perpendicular to both axes 111, 112. When assembled into valve 50 (FIG. 1), axis 111 aligns with axis 62.

Figure 4:
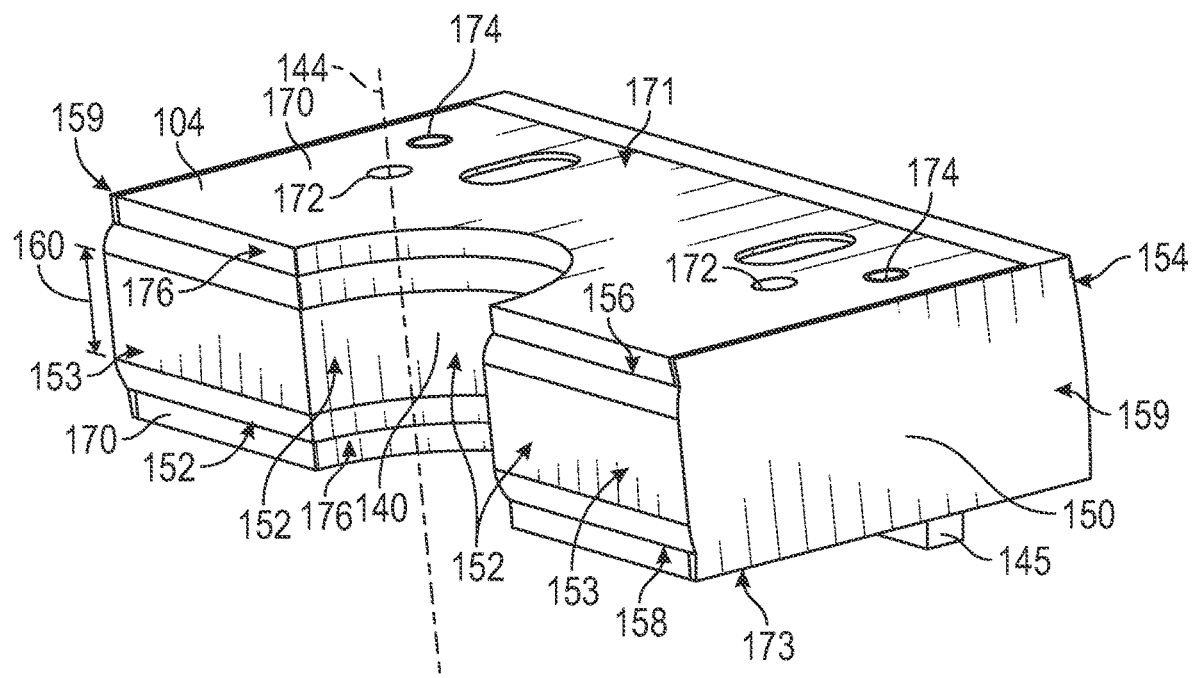
FIG. 4 shows a perspective view of the plate-backed seal of the ram in FIG. 2.

FIG. 4 shows that plate-backed seal 104 includes a resilient seal member 150 bonded between upper and lower protective plates 170. Seal 104 includes a semi-circular channel or recess 140 extending through the front ends of seal member 150 and plates 170. Recess 140 is centered about an axis 144 located at one end of seal 104 and is configured to be positioned around tubular member 56. Plate-backed seal 104 is configured to have axis 144 be positioned parallel to ram axis 112 (FIG. 3). A boss or key 145 extends laterally along bottom of lower plate 170 and is configured to limit the axial movement of seal 104 with respect to ram body 102 when received in keyway 126 (FIG. 2).

Continuing to reference FIG. 4, seal member 150 includes a front, fluid-facing end or end surface 152, an opposite end surface 154, a laterally-extending top surface 156 positioned against upper plate 170, a laterally-extending bottom surface 158 positioned against lower plate 170, and two side surfaces 159. Fluid-facing end surface 152 includes portion a portion or all of recess region 140 and two generally rectangular regions 153 aligned with axis 144 and located on opposite sides of recess 140. Seal member 150, including end surface 152, is characterized by a resting height or thickness 160 extending between plates 170. Seal member 150 may be fabricated from an elastomeric or rubber material, as examples. The fluid-facing end surface 152 is convex, bulging outward as it extends from top and bottom towards a central plane that can be imagined to pass through seal member 150 parallel to the two plates 170. The convexity of surface 152 extends along both regions 153 and along recess 140.

Figure 5:
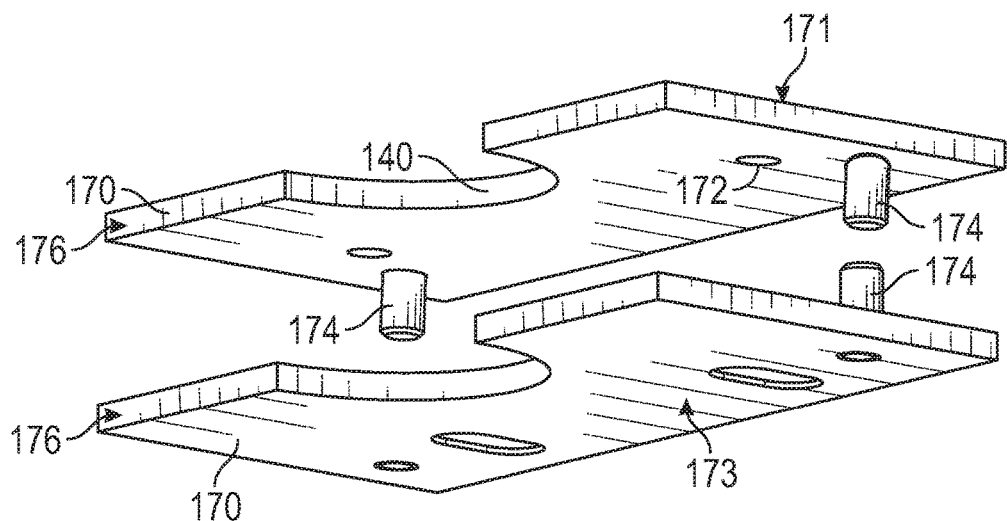
FIG. 5 shows a perspective view of the protective plates of the seal in FIG. 4.

Referring now to both FIG. 4 and FIG. 5, upper protective plate 170 includes a top surface 171, and multiple, spaced-apart holes 172 open through top surface 171. Lower protective plate 170 is similar or identical to upper plate 170 and includes a bottom surface 173. Plates 170 also include a fluid-facing end or end surfaces 176, parallel or generally parallel to surface 152. Multiple pins 174 extend from each plate 170 into seal member 150, proximal the end surface 154. In at least this embodiment, plates 170 extend from fluid-facing end surface 152 of seal member 150 toward the rear end surface 154, but are slightly shorter than seal member 150, not reaching the end surface 154. In some embodiments, one or both plates 170 extend entirely across seal member 150, reaching the end surface 154.

Figure 6:
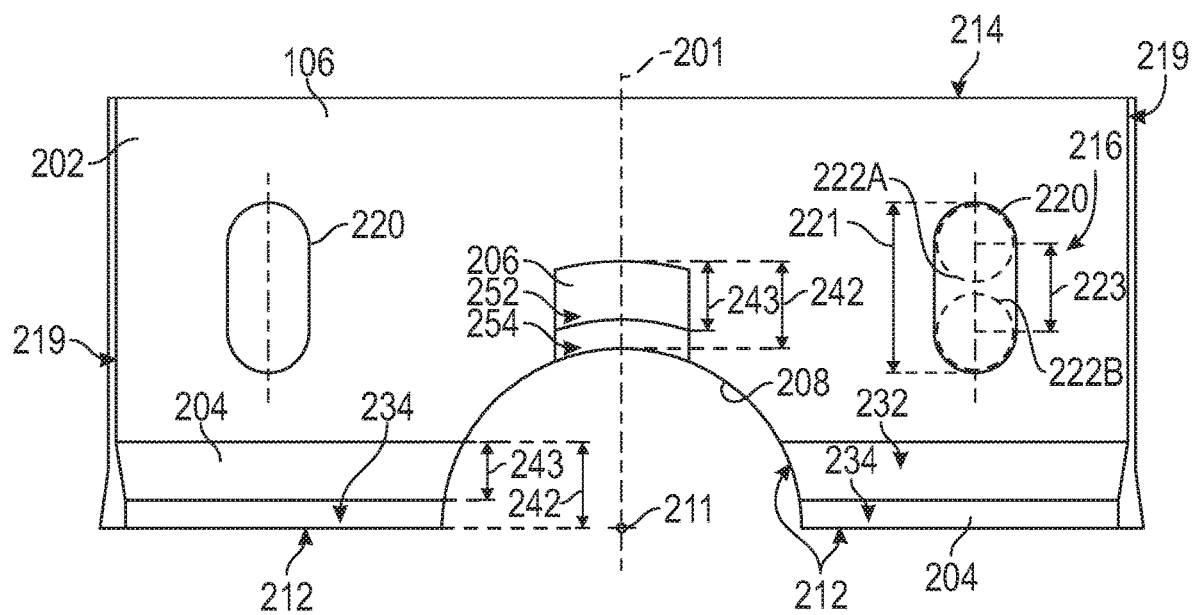
FIGS. 6, 7, and 8 show three standard views of the actuator of FIG. 2.
Figure 7:
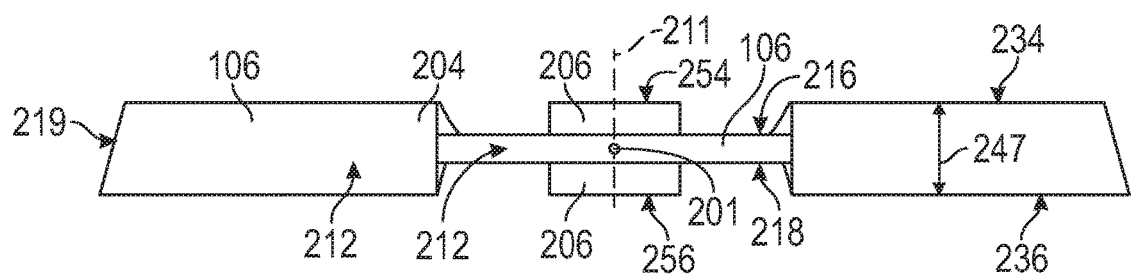
Figure 8:
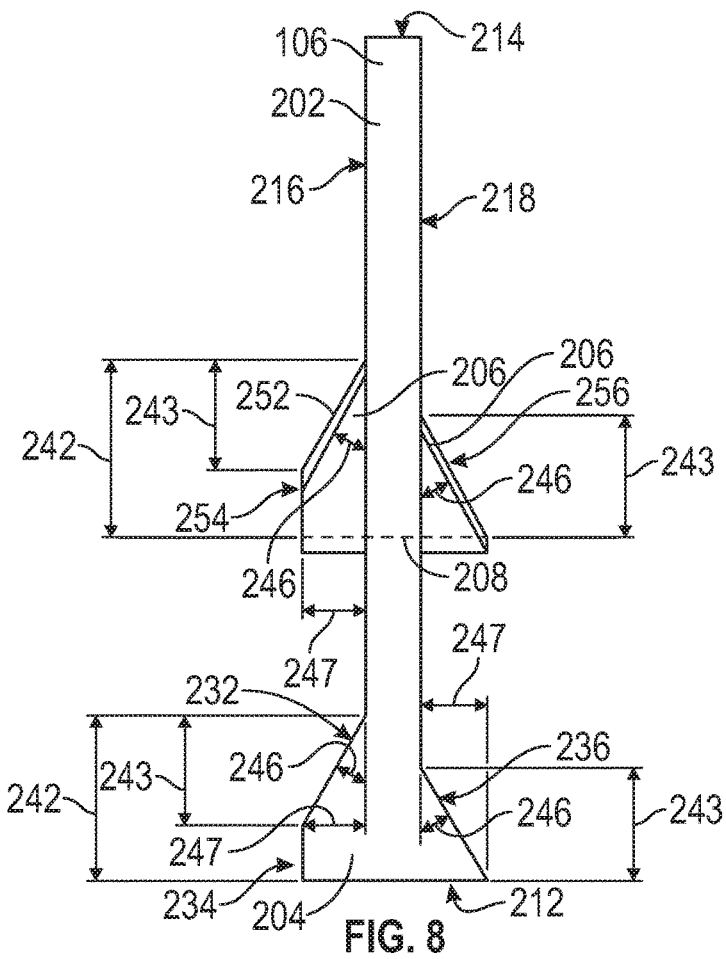

Referring to FIG. 6, FIG. 7, and FIG. 8, actuator 106 includes a central body axis 201, a body portion 202, a wedge portion 204, a central wedge portion 206, a fluid-facing end surface 212, an opposite end surface 214, a top surface 216, a bottom surface 218, first and second side surfaces 219, and multiple receiving slots 220. When actuator 106 is installed within ram body 102, plate axis 201 is aligned parallel to ram axis 111. In this embodiment, actuator 106 is configure as a generally planar member and may also be called actuator plate 106. Actuator plate 106 also includes a semi-circular channel or recess 208 centered on a traverse axis 211 and passing through body portion 202, wedge portion 204, and end surface 212. Central axis 201 defines the lengthwise direction for plate 106 and divides in half each of the portions 202, 204, 206 and recess 208. Axis 212 is perpendicular to axis 201. Top and bottom surfaces 216, 218 are parallel or substantially parallel and extend across body portion 202; body portion 202 is free of camming surfaces. Fluid-facing end surface 212 is perpendicular or substantially perpendicular to top and bottom surfaces 216, 218. Side surfaces 219 are tapered, curved, or otherwise contoured to conform or generally to match the outer surface 116 of ram body 102 adjacent the location of actuator plate 106. As best seen in FIG. 6, actuator plate 106 includes two receiving slots 220, which are located between wedge portion 204 and end surface 214, on opposite sides of axis 201 and recess 208. Slots 220 extend parallel to axis 201, and each has a slot length 221. When assembled, as discussed below, each slot 220 slidingly receives a fastener or pin to limit the movement of plate 106. Normally, plate 106 and its slots 220 moves relative to the pins, but for sake of discussion, the two extreme positions 222A, 222B of a pin are indicated within one of the slots 220 on FIG. 6, as if the pin were to move. The center-to-center distance 223 between the two pin positions 222A, 222B defines the maximum travel distance of plate 106 and may also be called the functional length of slots 220. In various embodiments, slots 220 are configured to prevent plate 106 from traveling entirely into cavity 108 of ram body 102. This configuration may be achieved, for example, by a particular axial positioning of slots 220 with respect to axis 201 or by making functional length 223 of the slots less than the wedge length 242.

Wedge portion 204 extends lengthwise from body portion 202 to end surface 212, extends widthwise between side surfaces 219 and is divided widthwise into two portions by recess 208, which is between sides 219. Wedge portion 204 includes a top camming surface 232, an extension surface 234 extending from surface 232 to end surface 212, and a bottom camming surface 236. Measured along or parallel to axis 201, wedge portion 204 has a wedge length 242; a portion of this length is the camming length 243 of top camming surface 232, and the remaining portion is the length of extension surface 234. Top camming surface 232 is oriented at a wedge angle 246 with respect to top surface 216. In the embodiment shown in FIG. 8, wedge angle 246 equals 30 degrees, and surface 232 achieves a height 247 from top surface 216. Extension surface 234 is parallel to top surface 216 and is disposed at the same height 247. Bottom camming surface 236 is oriented at the same wedge angle 246 with respect to bottom surface 218, extends the same camming length 243, and achieves the same height 247; although, surface 236 intersects fluid-facing end surface 212 without an intermediate extension surface, such as surface 234. Consequently, the wedge length of surface 236 is equal to its camming length 243 in this embodiment.

Referring still to FIGS. 6, 7, and 8, central wedge portion 206 extends lengthwise along axis 201, ending at the center of recess 208 and is curved to match the curvature of recess 208. Wedge portion 206 includes a central top camming surface 252, an extension surface 254 extending from surface 252 to recess 208, and a central bottom camming surface 256. Top and bottom camming surfaces 232, 256 are oriented at the wedge angle 246 with respect to top and bottom surfaces 216, 218, respectively, extend the same camming length 243, and achieve the same height 247, as previously described. Central bottom camming surface 256 intersects fluid-facing end surface 212 without an intermediate extension surface, such as surface 254; consequently, the wedge length of surface 256 is equal to its camming length 243.

In some embodiments, actuator plate 106 flexes or bends along its length (front to back) when it is slides against and compresses plate-backed seal 104 within ram cavity 108. In some embodiments, the lengths, angles and the resulting heights of some camming surfaces 232, 236, 252, 256 or extension surfaces 234, 254 may differ from others of this group of surfaces. In some embodiments, the wedges also include extension surfaces extending from bottom camming surfaces 236, 256, or an extension surface may taper with respect to top surface 216 rather than being parallel. Although wedge angle 246 was described as 30 degrees in the exemplary embodiment disclosed above, in various embodiments the wedge angle 246 is selected from a value within the range 5 to 30 degrees (end points included, typical) or within the range 10 to 22.5 degrees, from 5 to 40 degrees, or selected from a value within any range that is within one of these ranges, as examples. Other values of angle 246 may provide acceptable performance of actuator plate 106 as it slides across plate-backed seal 104. In some embodiments, the total wedge angle of a wedge portion 202, 206 is twice the value of the wedge angle 246.

Figure 9:
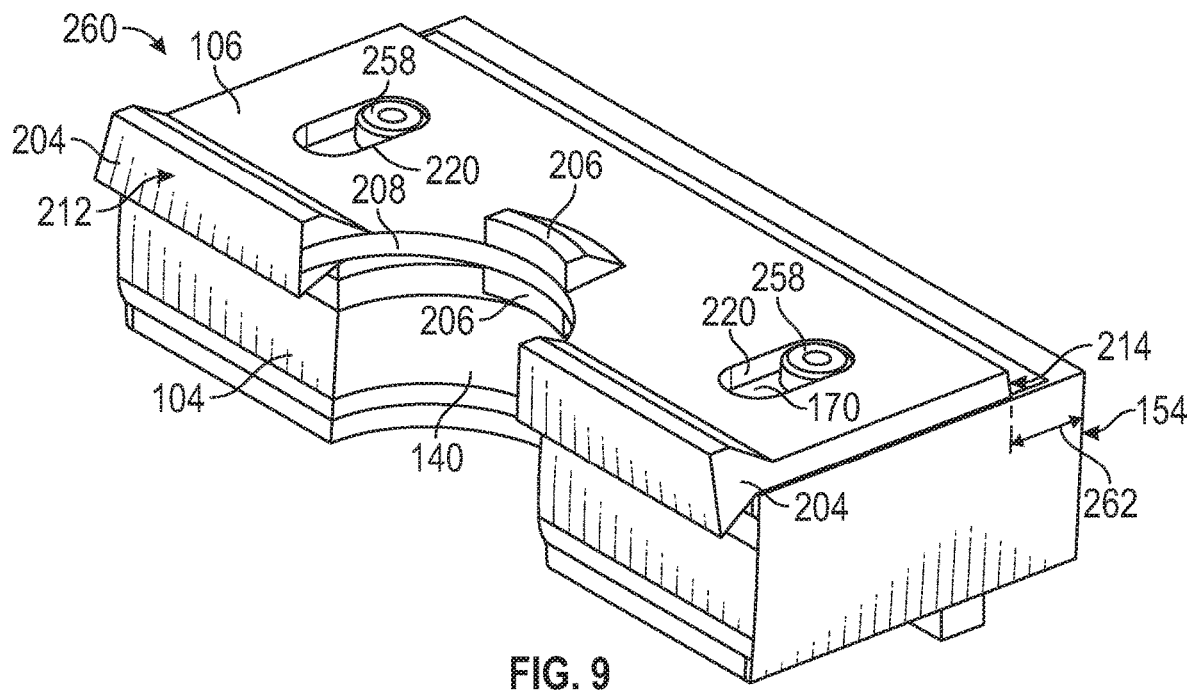
FIG. 9 shows an assembly of the actuator of FIG. 6 and the seal of FIG. 4.

In the embodiment shown in FIG. 9, actuator plate 106 is slidingly coupled to plate-backed seal 104 by multiple fasteners or pins 258 forming a seal assembly 260. One of the pins 258 is firmly coupled within each of the holes 172 on upper protective plate 170 (FIG. 4) and extends into an aligned slot 220 of plate 106. Thus, in FIG. 9, assembly 260 includes two pins 258. Pins 258 serve at least to guide and to limit the movement of actuator plate 106 relative to plate 170 and seal member 150 during compression and during re-expansion, acting as a mechanical stop in some instances. Pins 253 serve to prevent plate 106 from falling into the wellbore and to prevent plate 106 from becoming lodged within ram body 102, as examples. FIG. 9 shows a resting position of plate 106 with respect to plate-backed seal 104. In this resting position, the end surface 214 of plate 106 is offset "forward" from the end surface 154 at the back of plate-backed seal 104 by a distance 262, such that surface 214 is closer to recess 140 of seal 104. The elongate slots 220 extend ahead of pins 258 by at least a portion of the distance 262. In the resting position, the recess 208 in plate 106 is offset forward from recess 140 in plate-backed seal 104.

Figure 10:
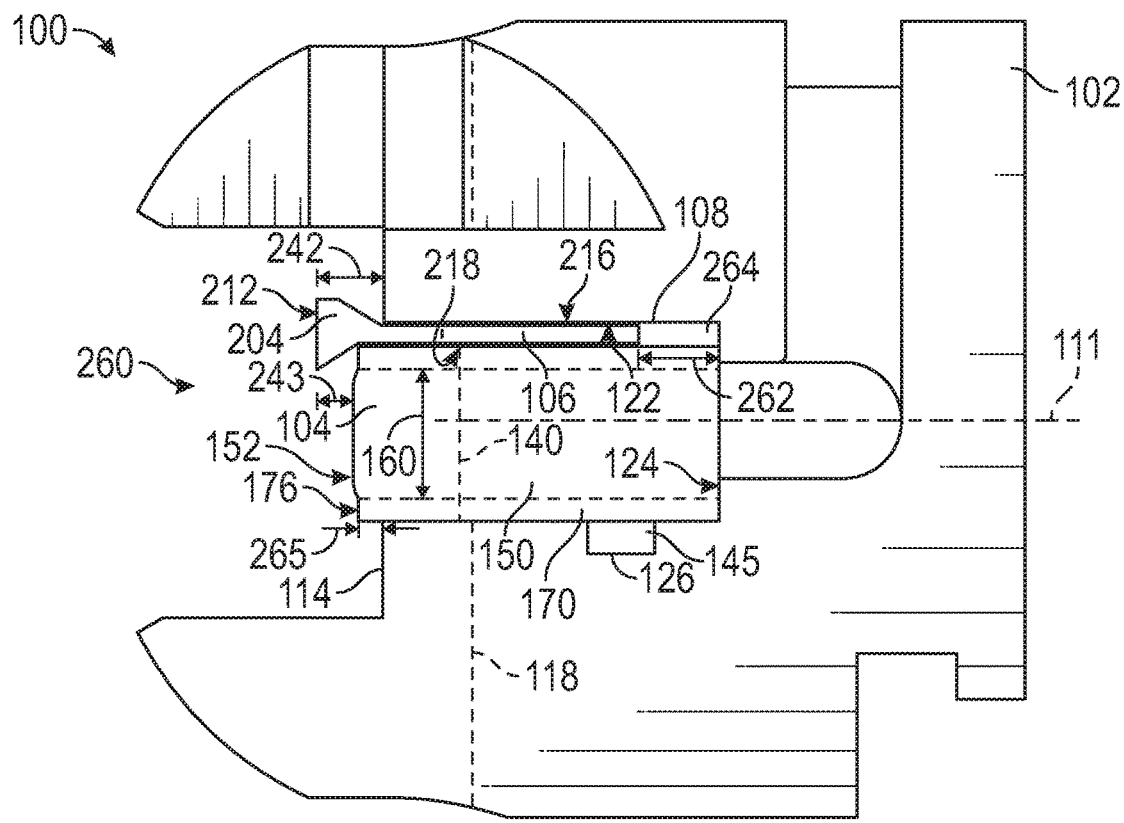
FIG. 10 shows a side view of the ram of FIG. 2 with the actuator and the seal in a resting position.

Referring now to FIG. 10, seal assembly 260 is positioned within cavity 108 of ram body 102 with key 145 received within keyway 126. The offset distance 262 leaves a gap 264 at the rear of cavity 108 when plate 106 and plate-backed seal 104 are resting within ram body 102, as shown. The bottom surface 218 of plate 106 engages the upper protective plate 170, and top surface 216 engages upper receiving surface 122 of cavity 108. The gap 264 and the forward position of slots 220 (with respect to pins 258; FIG. 9) configure actuator plate 106 to slide toward the rear of ram cavity 108 to a second, compression position when an actuation force is applied to the end surface 212 of wedge portion 204. The actuation force may be directed parallel or generally parallel to axis 111, as examples. At the same time, slots 220 and pins 258 limit the distance actuator plate 106 may travel as it moves toward the compression position. Referring now to FIG. 2 as well as FIG. 10, which both show a first or resting position of plate-backed seal 104 and plate 106 within ram body 102. The resting thickness 160 of seal member 150 is again indicated. Plate-backed seal 104 rests against the rear surface 124 and extends beyond cavity 108 and front end 114 by a distance 265 less than or equal to the difference between wedge length 242 and camming length 243. Thus, in this embodiment, the distance 265 is less than or equal to the length of extension surfaces 234, 254 (FIG. 6). Along the top of actuator plate 106, wedge portions 204, 206 are offset beyond front end 114 of ram body 102 by the full wedge length 242. However, as is visible along the bottom of plate 106, wedge portions 204, 206 are offset beyond plate-backed seal 104 by a shorter length, e.g. the camming length 243, due to the extension of seal 104 beyond cavity 108. Similarly, in the embodiment shown in FIG. 10, fluid-facing end surface 212 of actuator plate 106 extends beyond the fluid-facing end surface 152 of seal member 150.

Figure 11:
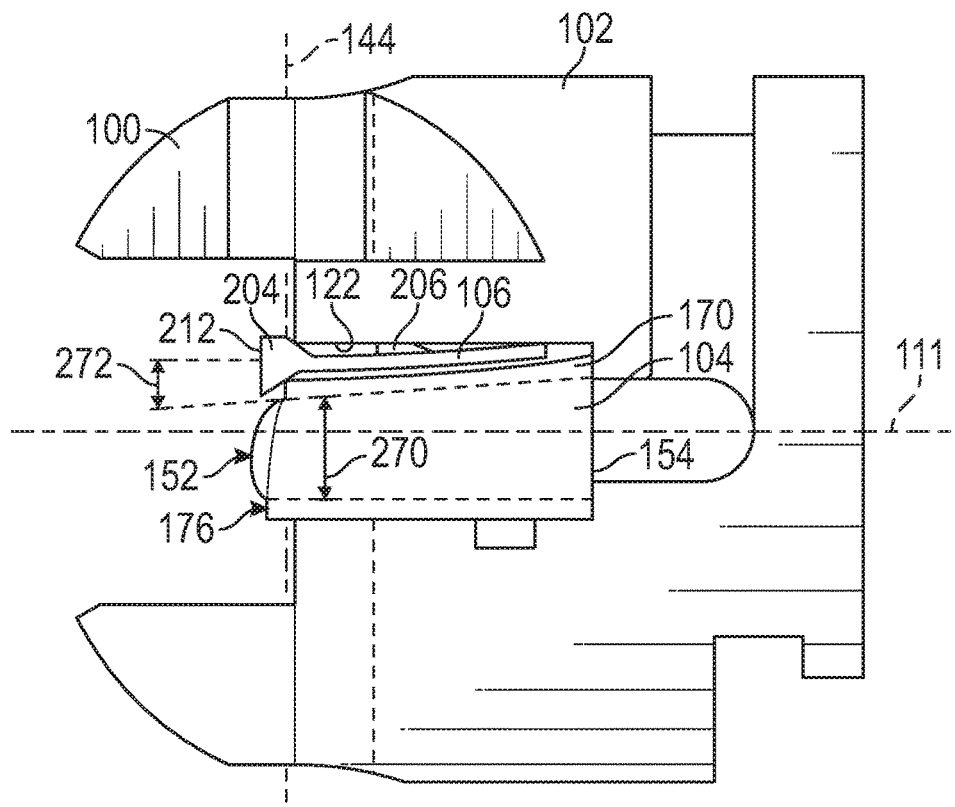
FIG. 11 shows a side view of the ram of FIG. 2 with the actuator and the seal in a compression position.

FIG. 11 shows an example of a condition in which actuator plate 106 has been moved to a second, compression position further into cavity 108 of ram body 102 causing plate-backed seal 104 to be compressed to a shorter height or thickness along axis 144, perpendicular to axis 111. Referring to FIG. 8 as well as FIG. 11, the plate-backed seal 104 is configured such that movement of the actuator plate 106 from the resting position (FIG. 10) toward the compression position causes the top camming surfaces 232, 252 of actuator plate 106 to bear against the upper receiving surface 122 of cavity 108 and causes the bottom camming surfaces 236, 256 to bear against the upper protective plate 170 and compress the resilient seal member 150. Preferably, this action involves segments of wedge portion 204 located on both sides of recess 208 (FIG. 9) as well as central wedge portion 206. In general, the volume of seal member 150 remains constant as it transitions between compression and relaxation states. Consequently, when it is compressed in one direction, it expands in one or more other direction.

In particular, the front portion of seal member 150 that includes fluid-facing end surface 152 has been compressed to a height or thickness 270 that is less than the resting thickness 160 (FIG. 10). Seal member 150 experiences the greatest compressed adjacent wedge portions 204, 206. Seal member 150 experiences gradually less compression in the portions that extend toward opposite end surface 154. Adjacent the end surface 154, seal member 150 experiences visibly less compression or, potentially, no compression based on the configuration of actuator plate 106. In some instances, end surface 154 expands to a greater height to compensate for the compression at the other end of seal member 150. In FIG. 11, plate 106 has compressed plate-backed seal 104 to a condition in which upper plate 170 and the top surface 156 of seal member 150 are positioned at an angle 272 with respect to their resting position. In this example angle 272 equals 10 degrees. The average, compressed thickness of seal member 150 along its axial length is less than its resting thickness 160 (FIG. 10). The previously convex fluid-facing end surface 152 of the seal member 150 has moved or extended outward beyond its resting position, extending further beyond the fluid-facing end surfaces 176 of protective plates 170. Surface 152 has become even more convex as a result of actuator plate 106 being in the compression position. The end surface 152 extends axially beyond the fluid-facing end surface 212 of the actuator plate 106, at least in the example shown, in which no opposing object or surface limits the outward movement of surface 152.

Figure 12:
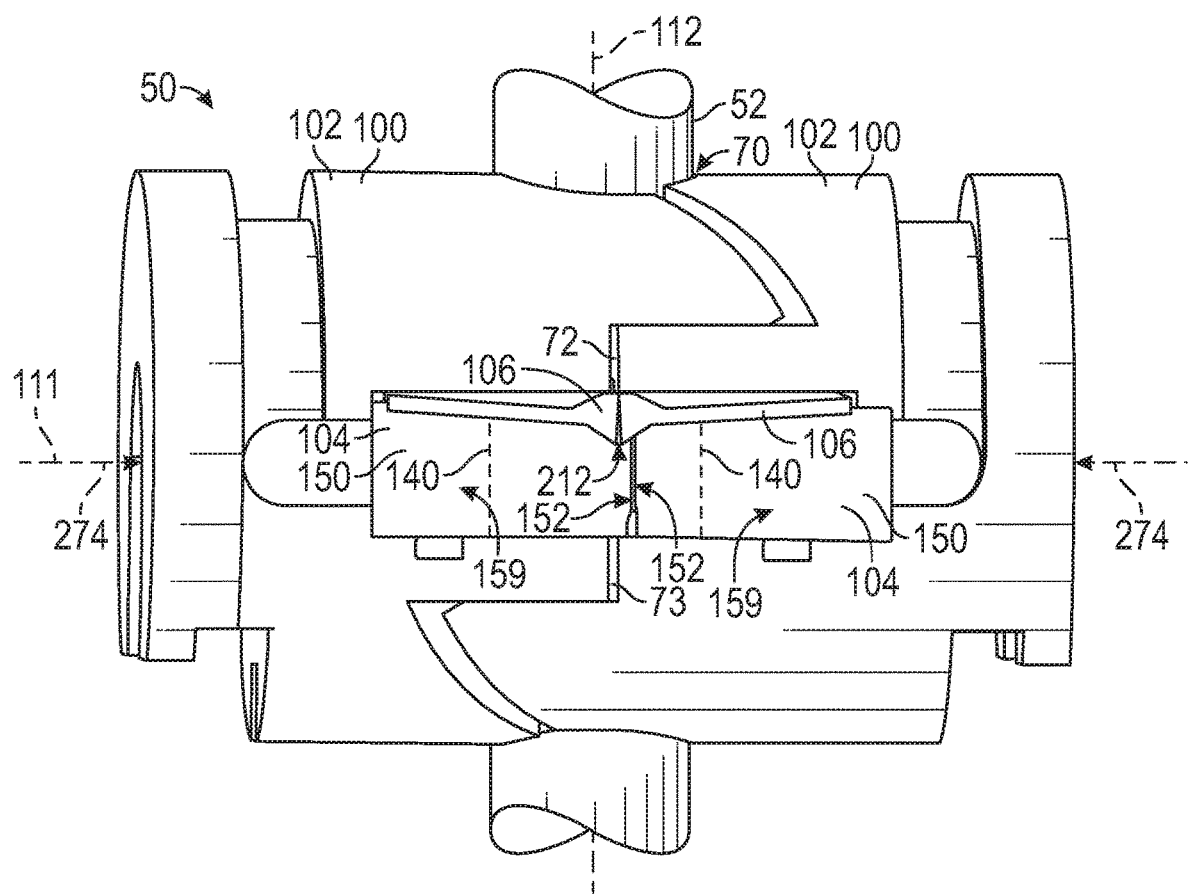
FIG. 12 shows a perspective side view of the two rams of FIG. 1 with the actuators and the seals in compression positions and sealing against a tubular member.

FIG. 12 shows two rams 100, as are used in valve 50 of FIG. 1, with a tubular member 52 located between rams 100. The two rams 100 have been brought proximal each other so that the end surfaces 212 of the two actuator plates 106 are pressed together as may be achieved by the action of opposing actuation forces 274 exerted through rams 100 parallel or generally parallel to ram axis 111. As a result, each plate 160 is in a compression position. The wedge portions 204 on plates 106 are configured to convert the actuation forces 274 to compression forces acting on seal member 150, acting parallel, or generally parallel, along the transverse axis 112, which is perpendicular or oblique to ram axis 111 and forces 274. Referring to FIG. 4 for detailed features, on each corresponding seal 104 in FIG. 12, the fluid-facing end surface 152 of seal member 150 has extended outward beyond its resting position. The rectangular regions 153 of the facing end surfaces 152 have contacted each other, and the opposing recesses regions 140 have expanded to contact tubular member 52 circumferentially. On average, each end surface 152 extends to the axial location of the intersecting fluid-facing end surfaces 212 on plates 106 that have contacted each other. Along annular fluid passageway 70, fluid zone 72 located on one side of the seal assemblies 104 is sealed, i.e. separated from fluid communication, from fluid zone 73 located on the opposite side of the seal assemblies 104. The entire circumference of tubular member 52 is sealed by seal members 150. The side surfaces 159 of seals 150 expand outward to seal against the cylindrical channel 68 of BOP valve body 52 in which rams 100 are slidingly received (FIG. 1). In the example of FIG. 12, plates 106 have deformed, becoming curved upward along their length as a result of compressing seal member 150, but other embodiments may be configured to minimize or effectively eliminate such deformation of plate 106.

Figure 13:
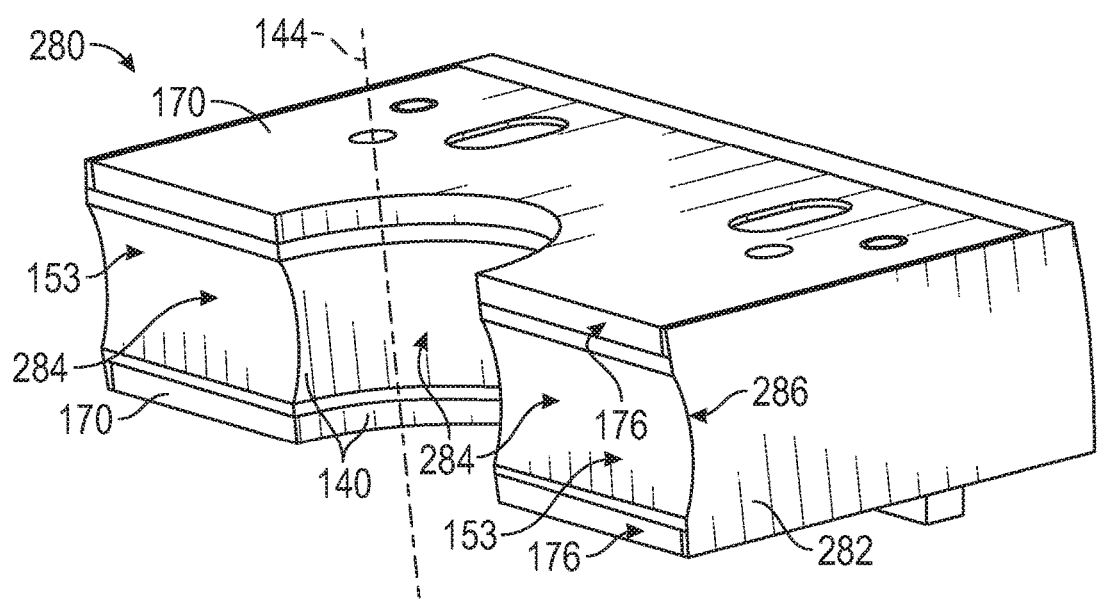
FIG. 13 shows another embodiment of a seal assembly compatible with the ram and sealing apparatus of FIG. 1 and having a concave fluid-facing end surface in accordance with principles described herein.

FIG. 13 shows a plate-backed seal 280 that includes a resilient seal member 282 bonded between upper and lower protective plates 170 with a semi-circular recess 140 extending through the front ends of seal 282 and plates 170. Plate-backed seal 280 is configured to be installed within ram body 102 as an alternative to plate-backed seal 104. Seal 280 has the same features and generally the same functionality as seal 104, and seal member 282 has the same features and generally the same functionality as seal member 150 except, the seal member 282 includes a front, fluid-facing end or end surface 284 with a concave groove 286 extending laterally, along its length, along two generally rectangular regions 153 and semi-circular recess 140. Concave groove 286 is recessed behind the fluid-facing end surfaces 176 of plates 170, indicating that seal 282 is in a resting position relative to plates 170.

When plate-backed seal 280 is installed in a ram body 102 with an actuator plate 106, they are configured similar the resting position shown in FIG. 10, but fluid-facing end surface 284 is concave. Similar to the configuration of FIG. 11, when the associated actuator plate 106 is pressed to a second, compression position further within ram body 102, the plate-backed seal 280 (FIG. 13) compresses along 144 to a shorter height or thickness, and concave front end surface 284 budges outward beyond fluid-facing end surfaces 176 of protective plates 170, becoming convex. For embodiments using similar materials, the outward extension achieved by surface 284 of seal member 282 during compression is less than is achieved by fluid-facing end surface 152 of seal member 150, but both surfaces 152, 284 are convex when compressed.

Figure 14:
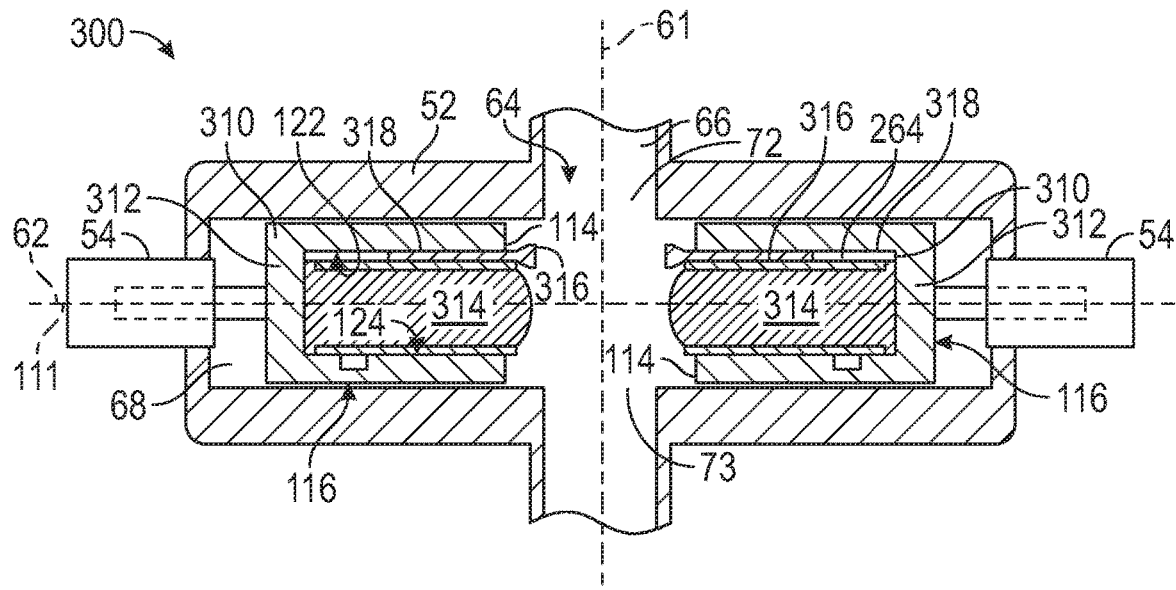
FIG. 14 shows a side view, partially in cross-section, of another embodiment of a sealing apparatus having multiple rams configured as a moveable seal holders in accordance with principles described herein, the rams having.

Referring to FIG. 14, another embodiment of a sealing apparatus, consistent with the present disclosure is a valve 300 that includes a valve body 52, multiple "blind" rams 310, and multiple hydraulic piston-cylinder assemblies 54, each configured to actuate one of the rams. In some instances, valve 300 may be used as a BOP. In some instances, valve 300 may be used as a blow-out preventer (BOP). Body 52 includes a flow axis 61, a ram axis 62 perpendicular to flow axis 61, and an interior surface 64. Interior surface 64 includes a flow channel 66, which is a through-bore passing entirely through body 52 along flow axis 61, and an actuator channel 68 extending along ram axis 62 and intersecting channel 66. During an exemplary installation, flow axis 61 is vertical and ram axis is horizontal. The rams 310 are slidingly received within channel 68 on opposite sides of axis 61. The positioning of the rams 310 within body 52 divides the fluid passageway that is channel 66 into an upper fluid zone 72 and a lower fluid zone 73. Valve 50 is configured to close and to open fluid communication between zones 72, 73 by sliding rams 310 along ram axis 62 toward or away from each other. Rams 310 are configured to seal against each other.

Ram 310 is a sealing apparatus and, in this embodiment, is configured as an assembly that includes a generally cylindrical ram body 312 as well as a plate-backed seal 314 and an actuator 316. Plate-backed seal 314 and actuator 316 extend out from a cavity 318 in ram body 312, extending parallel to axis 62 when installed in valve body 52. Actuator 316 extends further out than does seal 314 in the resting position of FIG. 14. Ram body 312 is therefore configured as a moveable seal holder.

Ram body 312 includes a central or longitudinal axis 111 aligned with axis 62, a front end 320, an outer surface 116 contoured to match channel 68 in body 52 and the cavity 318. Like cavity 108 of ram 100, cavity 318 is generally rectangular, extending through front end 320 parallel to axis 111 and extending laterally in width through outer surface 116 at two opposite locations. Cavity 318 includes an upper receiving surface 122 and a lower receiving surface 123, that oppose each other and extend parallel to axis 111. Front end 320 is laterally uniform in shape, lacking the curvature or discontinuity of an intermediate feature, such as channel 118 of FIG. 3.

Figure 15:
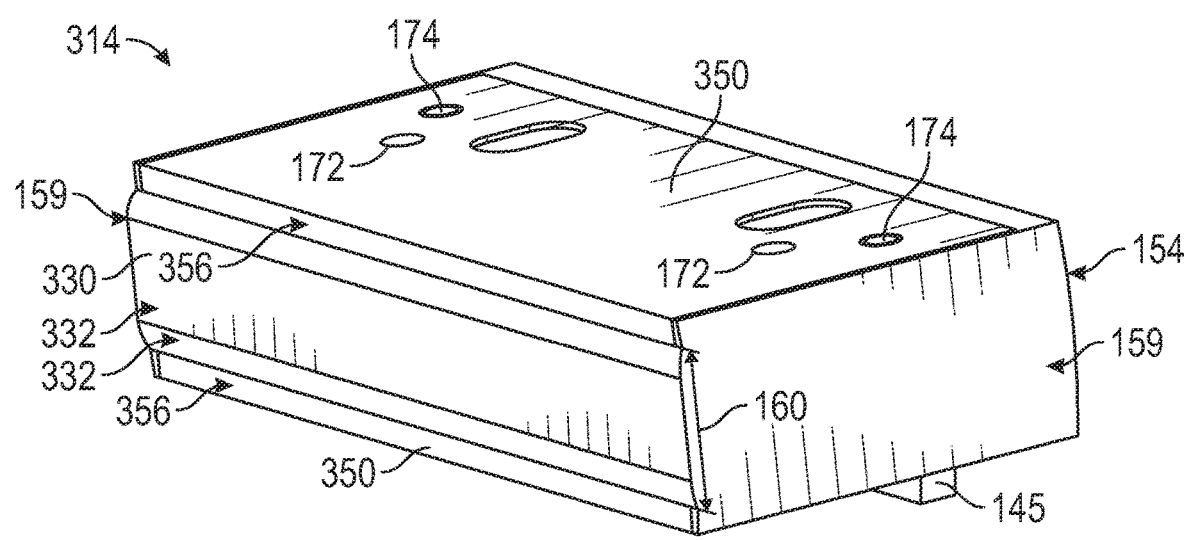
FIG. 15 shows a perspective view of the seal assembly of the ram in FIG. 14.

As best shown in FIG. 15 plate-backed seal 314 includes a resilient seal member 330 bonded between upper and lower protective plates 350. Plate-backed seal 314 is similar in features and functionality to plate-backed seal 104 (FIG. 4), except plate-backed seal 314 lacks a semi-circular recess 140 extending through the front ends of seal member 330 and plates 350. A boss or key 145 extends laterally along bottom of lower plate 350 perpendicular to axis 111 and is configured to limit the movement of plate-backed seal 314 with respect to ram body 312 (FIG. 14).

Seal member 330 includes a front, fluid-facing end or end surface 332, an opposite end surface 154, and two side surfaces 159. Surface 332 is laterally uniform in shape, lacking the curvature or discontinuity of an intermediate feature, such as semi-circular recess 140 of FIG. 4. More specifically, in the example of FIG. 15, Fluid-facing end surface 332 extends directly, i.e. straight, between the two side surfaces 159 and perpendicular to axis 111. Seal member 330, including end surface 332, is characterized by a resting height or thickness 160 extending between plates 350. Seal member 330 may be fabricated from an elastomeric or rubber material, as examples. The fluid-facing end surface 332 is convex, bulging outward beyond the two plates 350.

Continuing to reference FIG. 15, upper protective plate 350 is rectangular and includes a fluid-facing end or end surface 356 parallel or generally parallel to surface 332 and includes multiple, spaced-apart holes 172. Lower protective plate 350 is similar or identical to upper plate 350. Multiple pins 174 extend from each plate 350 into seal member 330, proximal the end surface 154. In at least this embodiment, plates 350 extend from fluid-facing end surface 332 of seal member 330 toward the rear end surface 154, but are slightly shorter than seal member 330, not reaching the end surface 154.

Referring to FIG. 16 and FIG. 17, actuator 316 includes similar in features and functionality to actuator plate 106 (FIG. 6), except actuator 316 lacks a semi-circular recess 208 and a central wedge portion 206. Accordingly, actuator 316 includes body portion 362, a wedge portion 364, a fluid-facing end surface 366, an opposite end surface 214, a top surface 216, a bottom surface 218, first and second side surfaces 219, and multiple receiving slots 220. In this embodiment, actuator 316 is configure as a generally planar member and may also be called actuator plate 316. Body portion 362 is rectangular or generally rectangular. Top and bottom surfaces 216, 218 are parallel or substantially parallel and extend across body portion 362; body portion 362 is free of camming surfaces. Fluid-facing end surface 366 is perpendicular or substantially perpendicular to top and bottom surfaces 216, 218.

Wedge portion 364 extends lengthwise from body portion 362 to end surface 366, and extends widthwise directly between two side surfaces 219. Thus, wedge portion 364 and the end surface 366 are laterally uniform in shape, lacking the curvature or discontinuity of an intermediate feature, such as recess 208 (FIG. 6). Like wedge portion 204, wedge portion 364 includes a top camming surface 232, an extension surface 234 extending from surface 232 to end surface 366, and a bottom camming surface 236, each having the dimensions previously described with respect to FIG. 8.

Referring again to FIG. 14, actuator plate 316 is slidingly coupled to plate-backed seal 314 by multiple fasteners or pins, forming a seal assembly, like seal assembly 260 in FIG. 9. FIG. 14 shows a resting position of plate 316 with respect to plate-backed seal 314. In this resting position, the end surface 214 (FIG. 16) of plate 316 is offset "forward" from the end surface 154 at the back of plate-backed seal 314, leaving a gap 264 within the top rear of channel 318.

Referring still to FIG. 14, the operation of valve 300 to close and to open is similar to valve 50, except valve 300 is configured to seal when no tubular member is located between the opposing rams 310. FIG. 14 shows valve 300 in an open condition, with each pair of plate 316 and plate-backed seal 314 in a non-compressed, resting position with respect to ram body 312. The convex, fluid-facing end surface 332 extends outward beyond the fluid-facing end surfaces 356 of protective plates 350. In order for valve 300 to close and seal, the two rams 310 are pushed towards each other by piston-cylinder assemblies 54 so that the end surfaces 366 of the two plates 316 are pressed together, causing each plate to go to a compression position with respect to ram body 312. Each plate 316 moves further into the receiving cavity 318 of ram body 312, causing plate-backed seal 314 to be compressed to a shorter height or thickness along axis 61 due to the action of top and bottom camming surfaces 232, 236, as previously described. As a result, the fluid-facing end surfaces 332 of seal members 330 extend further outward, beyond their resting position, further beyond the fluid-facing end surfaces 356 of protective plates 350. Ultimately, end surfaces 332 of the two opposing seals members 330 contact each other. In some at least some instances, the already convex surfaces 332 becomes more convex. On average, each end surfaces 332 extends to the axial location of the fluid-facing end surfaces 366 on the plates 316 that contacted each other. Plate-backed seal 314 become angled, and the front portion of seal member 330, including end surface 332, compress to a thickness that is less than the resting thickness 160, similar to angle 272 and thickness 270 shown in FIG. 11. Once valve 300 of FIG. 14 is closed fluid passageway or channel 66 is divided such that fluid zone 72 located on one side of the seals 314 becomes sealed from the other fluid zone 73 located on the opposite side of the seals 314. The side surfaces 159 of seals 330 expand outward to seal against the channel 68 in which rams 310 are slidingly received.

Figure 18:
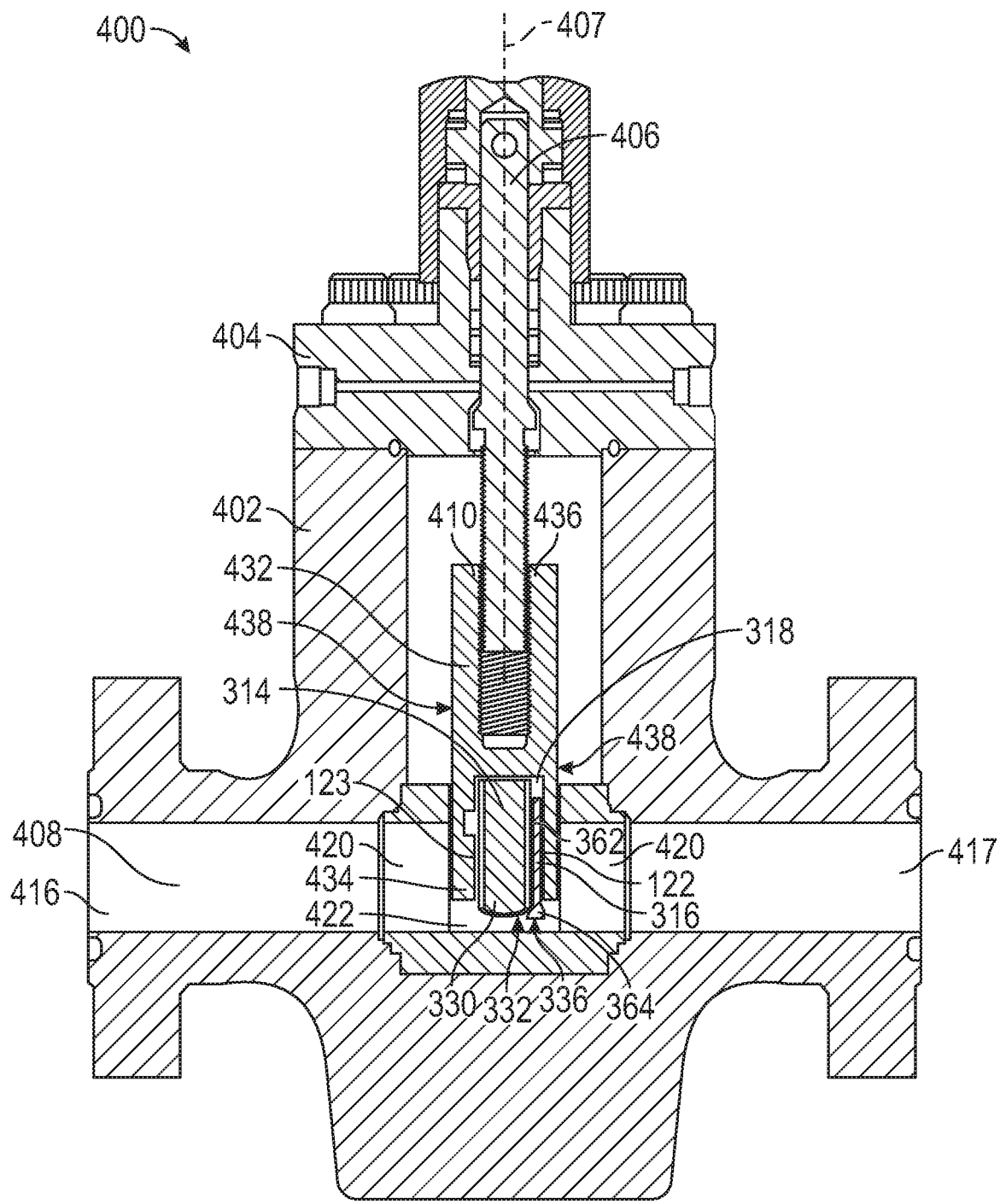
FIG. 18 shows a cross-sectional side view of an embodiment of a gate valve having a gate configured as a moveable seal holder in accordance with principles described herein.

Referring now to FIG. 18, another embodiment of a sealing apparatus, consistent with the present disclosure is a gate valve 400 that includes a valve body 402, a bonnet 404, a valve stem 406 extending from bonnet 404 into body 402 along a stem axis 407, a fluid passageway 408, and a gate 410 slidingly received in body 402 and coupled to stem 406 for reciprocation, to open and close passageway 408. Stem 406 is exemplified as a captured valve stem 406 with gate 410 threadingly coupled for movement along stem 406. However, in some embodiments, a rising valve stem is used, and gate 400 is rotationally coupled to it without threads. Valve stem 406 is configured to apply to gate 410 an actuation force parallel to axis 407.

Fluid passageway 408 extends from inlet 416 to an exit 417 along a flow axis 418 that is perpendicular or generally perpendicular to stem axis 406. A valve seat 420 is located within Fluid passageway 408 between inlet 416 and exit 417. A groove 422 extends upward from passageway 408 or seat 420 and slidingly receives gate 410. In FIG. 18, valve 400 is partially open, having gate 410 situated between an open position and a closed position, partially inserted into valve seat 420.

Gate 410 is a sealing apparatus and is configured as an assembly that includes a plate-backed seal 314 and an actuator plate 316 extending out from a cavity 318 in a gate body 432, extending parallel to axis 407. Actuator plate 316 extends further out than does assembly 314 in the resting position of FIG. 18. Gate body 432 is therefore configured as a moveable seal holder. Plate-backed seal 314 and actuator plate 316 are also in the resting with respect to body 432 when gate 410 moves upward to the open position. Actuator plate 316 and plate-backed seal 314 are slidingly disposed adjacent each other, at least within cavity 318, forming a seal assembly. In at least some embodiments this seal assembly includes pins 238 like seal assembly 260 in FIG. 9.

Gate body 432 extends along axis 407 from a sealing end 434 to coupling end 436 and includes a cavity 318 extending inward from sealing end 434. Gate body 432 is rectangular or generally rectangular, having two flat outer surfaces 438 parallel to axis 407 that assist in blocking fluid flow through passageway 408 and slidingly engage valve seat 420. Sealing end 434 is received within seat 420. Cavity 318 is as described above for valve 300, including a receiving surface 122 and a receiving surface 123, extending parallel to axis 407. Sealing end 434 is laterally uniform in shape, lacking the curvature of an intermediate feature, such as channel 118 of FIG. 3.

Plate-backed seal 314 in FIG. 18 is as described above for valve 300, and includes, for example, a resilient seal member 330 bonded between a first and a second protective plate 350 (Shown in FIG. 15; not visible in FIG. 18). As described above seal includes a front, fluid-facing end surface 332. So also, seal assembly is rectangular or generally rectangular, lacking a semi-circular recess 140 extending through the front ends of seal member 330 and plates 350 so that fluid-facing end surface 332 is laterally uniform (e.g. from first side 159 to second side 159, FIG. 350) in shape, lacking the curvature of an intermediate feature, such as recess 140 of FIG. 4.

Actuator plate 316 in FIG. 18 is as described above for valve 300, and includes, for example, a body portion 362 and a wedge portion 364 extending from portion 362 to a fluid-facing end surface 366. As described, actuator plate 316 is rectangular or generally rectangular, lacking a semi-circular recess 208 so that wedge portion 364 and surface 366 are laterally uniform in shape, lacking the curvature of an intermediate feature, such as recess 208 of FIG. 6.

Continuing to Reference FIG. 18, gate 410 may be called a blind gate or a blind ram because gate body 432 or plate-backed seal 314 are laterally uniformly in shape, lacking the curvature of an intermediate feature (such as channel 118 of ram 104 and recess 140 of seal 104 in FIGS. 2 and 4). Regarding being uniformly shaped, in the embodiment of FIG. 18, sealing end 434 of body 432, end surface 332 of seal member 330, and end surface 366 of plate 316 extend straight in the direction that is perpendicular both axis 407 and axis 418 (i.e. extend "out-of-the-page"). In other embodiments, gate 410 and its end surfaces 434, 332, 336 may include a curvature that extends downward while being laterally uniformly in shape, lacking the curvature or discontinuity of an intermediate feature.

When gate 410 is moved fully into seat 420 to achieve the closed position, plate 316 and seam member 330 press against the distal side of channel 408, contacting either valve body 402 or seat 420. For example, valve 400 is configured so that fluid-facing end surface 366 engages a portion of seat 420, causing plate 316 to move to a compression position with respect to seal member 330 and gate body 432. This relative movement of plate 316, aided by wedge portions 364, causes seal member 330 to extend further, so that fluid-facing end surface 332 becomes more convex as it extends to seal passageway 408. Seat 420 also seals against portions of gate body 432. Thus, the gate body 432 is configured to move from an open position in which seal member 330 is spaced apart from the seat 420 to a closed position in which seal member 420 sealingly engages seat 420 to prevent fluid flow through body 402. The wedge portion 364 on plate 316 are configured to convert the actuation force of stem 406, which acts along axis 406, to a compression force acting on seal member 150 perpendicular, generally perpendicular, or oblique to axis 406.

Figure 19:
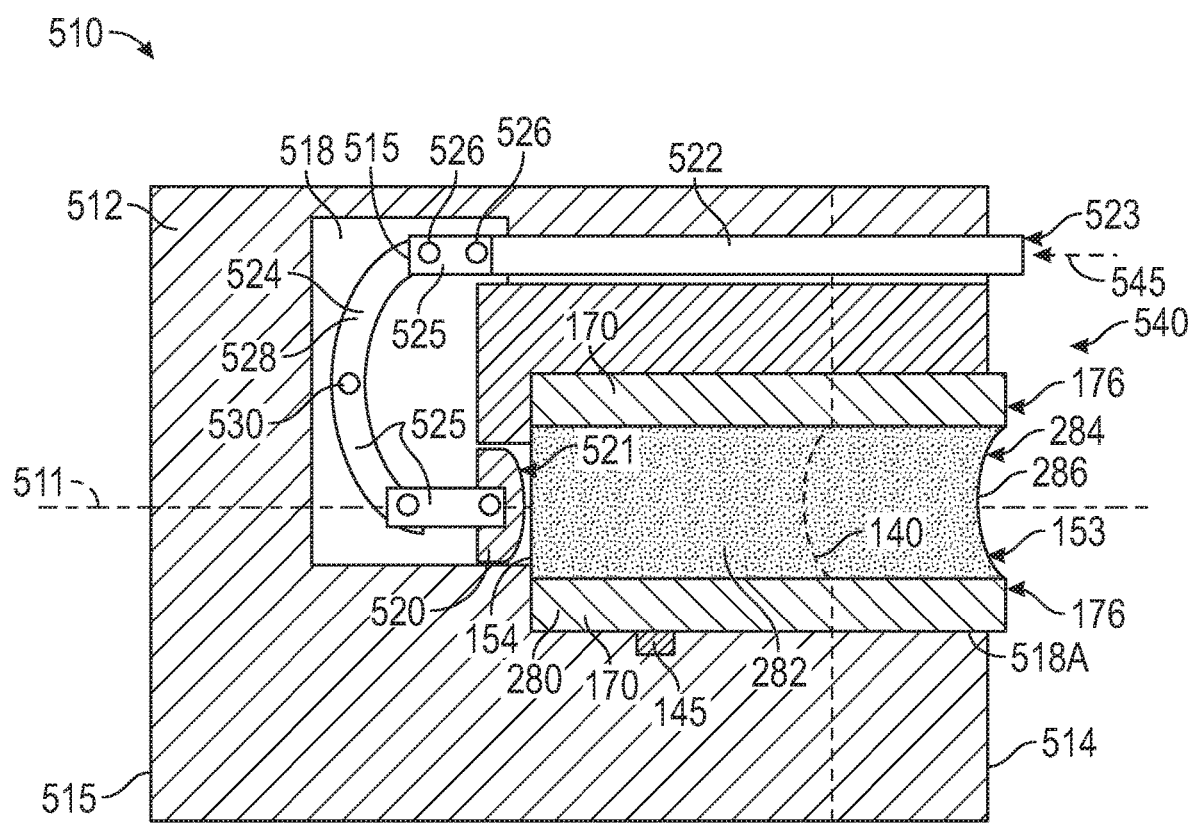
FIG. 19 shows a cross-sectional side view, partially in cross-section, of another embodiment of a ram configured as a moveable seal holder in accordance with principles described herein and suitable for use with the valves disclosed herein.

In FIG. 19, another embodiment of a sealing apparatus, consistent with the present disclosure is a ram assembly, or simply, ram 510 includes a longitudinal or central axis 511, a ram body 512, a plate-backed seal 280, and at least one actuator assembly 515. Seal 280 and actuator 515 extend out from a cavity 518 in ram body 312, having components extending parallel to axis 511. Ram body 512 is therefore configured as a moveable seal holder. Ram body 512 includes a front end 114, a back end 115, and the cavity 518. Cavity 518 includes a first and a second channel 518A, 518B offset from one another, perpendicular to axis 511. Cavity channels 518A, 518B extend through front end 114, parallel to axis 511.

Plate-backed seal 280 is as described above with regard to FIG. 13. For example, plate-backed seal 280 includes a includes a resilient seal member 282 bonded between upper and lower protective plates 170 with a semi-circular channel or recess 140 extending through the front ends of seal 282 and plates 170. As described above, seal 282 includes a front, fluid-facing end surface 284 with a lateral, concave groove 286, and an opposite end surface 154. End surface 284 is concave top-to-bottom between plates 170 due to groove 286 and includes the recess 140 and generally rectangular regions 153 on opposite sides of recess 140. End surfaces 284, 154 extend between plates 170, crossing axis 511. Plate-backed seal 280 is received within the surface or surfaces of cavity channel 518A and is held by a key 145 extending perpendicular to axis 511 and positioned in a keyway. Plates 170 also include a fluid-facing end surfaces 176 parallel to or aligned with surfaces 284.

Continuing to reference FIG. 19, actuator assembly 515 includes an actuator plate 520 and an actuator plate or rod 522, coupled by a linkage 524. Linkage 524 includes multiple linkage members 525, including an intermediate linkage member 528 coupled in series by rotational couplings 526. Intermediate linkage member 528 is mounted for rotation about a pivot axis 530 fixed with respect to ram body 512. Actuator plate 520 includes an actuation surface 521 that is positioned and configured to engage the end surface 154 of seal 282. Rod 522 includes a contact end surface 523 against which a force may be exerted by, for example, a similar surface on an actuator rod 522 of an opposing ram (not shown) or by a another movable or static surface. In at least some embodiments, the end surface 523 of rod 522 is a fluid-facing end surface. Actuator rod 522 is 518B slidingly received within the surface or surfaces of cavity channel 518B. Coupled as shown within ram body 512, plate-backed seal 280 and actuator assembly 515 form seal assembly 540. In some embodiments, assembly 540 includes multiple actuator assemblies 515 arranged laterally (deeper into FIG. 19), configured so that each actuator plate 520 engages a region of end surface 154 on seal 282. Optionally, the multiple actuator assemblies 515 share a single actuator plate 520.

FIG. 19 shows a resting position of actuator plate 520 adjacent end surface 154 of seal 282, prior to application of an actuation force 545. Front, fluid-facing end surface 284 is also in a resting position, concave and recessed between the plates 170. Actuator assembly 515 is configured such that exertion of the leftward force 545 on end surface 523 of rod 522 results in plate 520 and actuation surface 521 exerting a rightward compression force against the seal's end surface 154, which compresses seal 282 and extends the front, fluid-facing end surface 284, achieving a second, compression position for seal assembly 540. When actuator plate 520 is in this compression position, the fluid-facing end surface 284 extends beyond its resting position and extends beyond the fluid-facing end surfaces 176 of the first and second protective plates 170. When force 545 is released, the resiliency of seal member 282 causes the seal assembly 540 to return to the resting position of FIG. 19.

Thus, actuator plate 520 and rod 522 are configured to reciprocate between the resting position and the compression position, moving relative to the protective plates 170 and to the ram body 512. The movement of plate 520 and rod 522 alternatively compresses and relaxes seal member 282 and surface 284.

In various embodiments, ram 510 is compatible for installation and use in the various valves disclosed herein. As an example, in some embodiments, ram 510 is configured as a blind ram, including a plate-backed seal 314 in place of plate-backed seal 280, for use in valve 300 (FIG. 14) or gate valve 400 (FIG. 18) or another valve in accordance with principles described herein. The plate-backed seal 314 may have a convex or a concave fluid-facing surface on its sealing member. In some embodiments, ram 510 includes a plate-backed seal 104 (FIG. 4) having a convex fluid-facing surface on its sealing member, in place of plate-backed seal 280, which has a concave fluid-facing surface.

Figure 20:
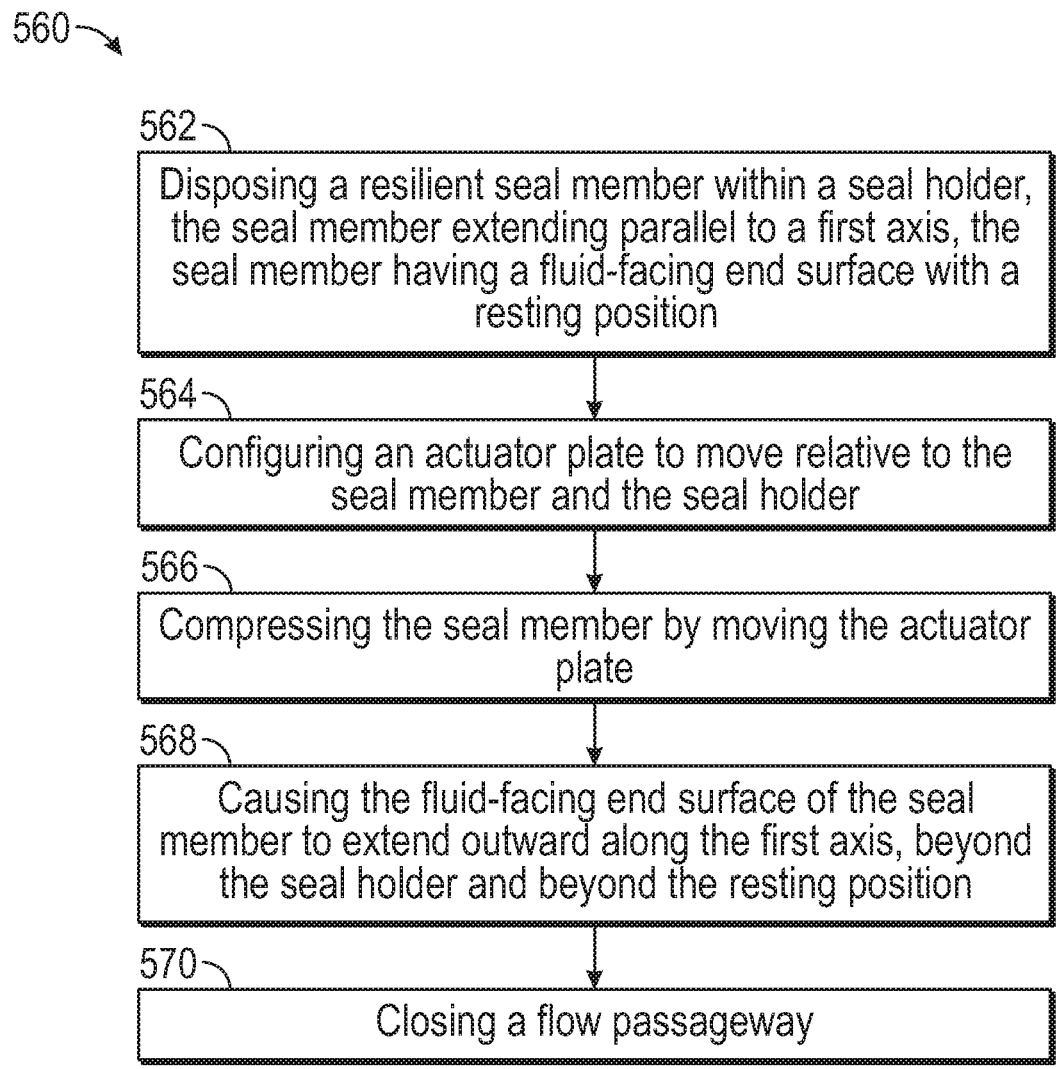
FIG. 20 shows a flow diagram showing a method for sealing a fluid passageway in accordance with principles disclosed herein.

FIG. 20 shows a method 560 for sealing a fluid passageway in accordance with the principles described herein. Blocks 562 through 570 describe an embodiment of the method. Various embodiments of method 400 may include fewer operations than described, and other embodiments of method 560 include additional operations.

Referring again to FIG. 7 actuator plate 106 includes both a wedge portion 204 at the outermost end of plate 106 divided by recess 208 and also a central wedge portion 206 that is set-back at the inner most part of recess 208. However, in some embodiments, an actuator plate includes a wedge portion 204 that extends on either side of a recess 208 but includes no central wedge portion 206. In other features, the actuator plate is similar to or derived from plate 106. Referring again to FIG. 8, although top camming surfaces 232, 252 and bottom camming surfaces 236, 256 employ the same wedge angle 246, in some other embodiments a different wedge angle is used for the bottom camming surfaces. Although actuator plate 106 was shown with camming surfaces 232, 252, 236, 256 extending away from both top surface 216 and bottom surface 218, some embodiments include camming surfaces extending from only top surface 216 and from only bottom surface 218, and in some instances, the wedge angle is twice the value described for wedge angle 246.

A particular resting position and a particular compression position of actuator plate 106 were presented in the discussion above. In other instances or for other embodiments, a different position of actuator plate 106 relative to ram body 102 or relative to plate-backed seal 104 may be defined to be the resting or the compression position. Different compression positions of plate 106 cause end surface 152 of the seal member 150 to bulge, to extend further outward by different distances.

FIG. 9 augmented by FIG. 4, showed multiple pins 258 firmly coupled within the holes 172 on protective plate 350 and extends into an aligned slot 220 of plate 106. In some other embodiments, the pins extend from the actuator plate and the slots are formed in the protective plate.

As explained for valve 50, so also for some embodiments of a valve 300, 400, the fluid-facing end surface 332 of the seal member is concave, having a shape similar to the outer regions 153 on surface 284 in FIG. 13, including periods when an accompanying actuator plate is in the resting position. Optionally, a fluid-facing end surface of a seal member is flat.

Figure 21:
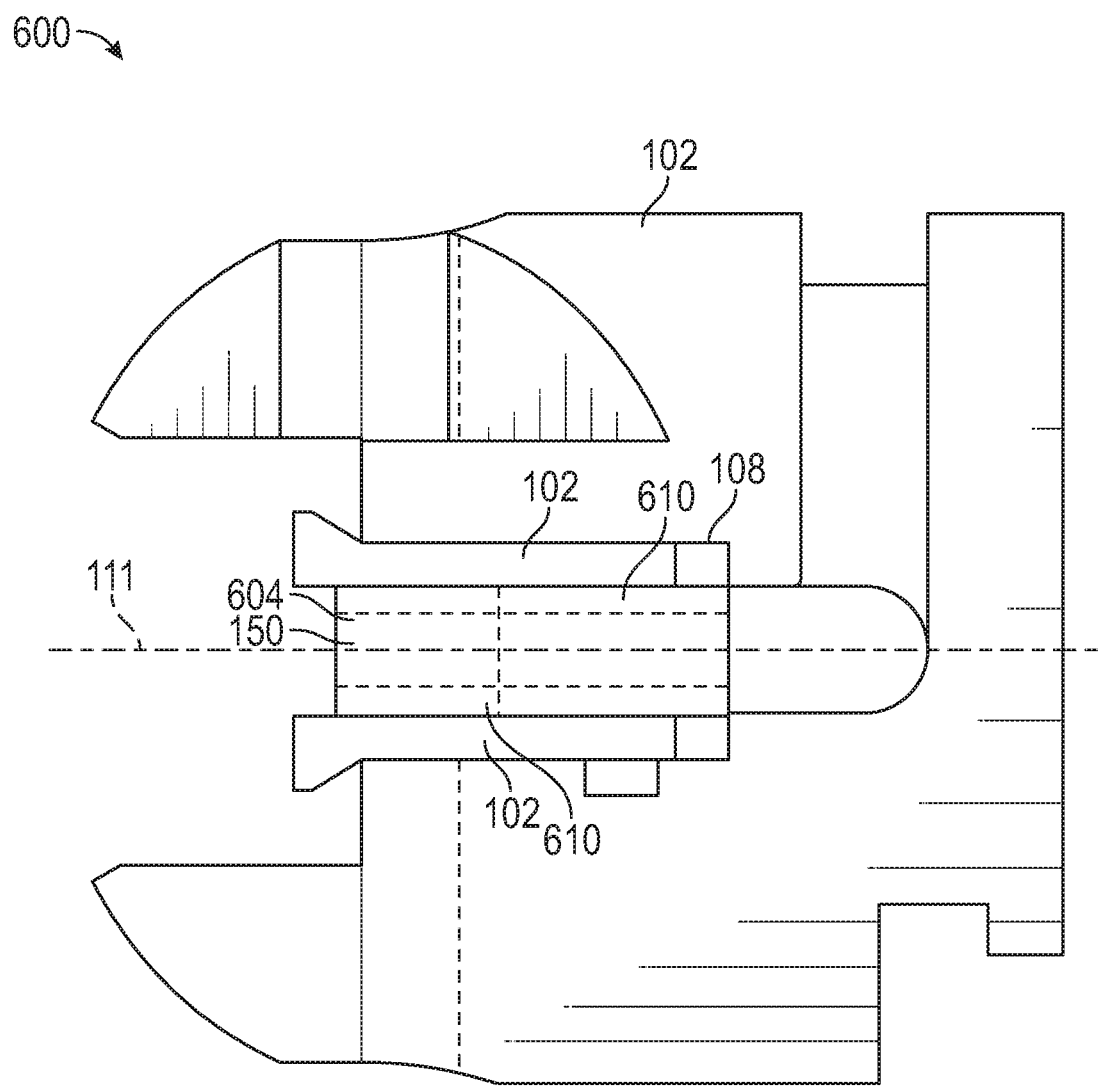
FIG. 21 shows a side view of a ram configured as a moveable seal holder with two actuators and a seal in accordance with principles described herein.

Some embodiments of a valve 50, 300, 400 include a second actuator plate located on the opposite side of the plate-backed seal 104, 314 to function similarly and simultaneously with the actuator 106, 316. As an example, FIG. 21 shows a ram 600 that may be installed as a moveable seal holder within valve 50 in place of a ram 100. Ram 600 includes a ram body 102 extending along an axis 111, a plate-backed seal 604, and with a pair of actuator plates 106. Ram body 102 and actuators 106 are as previously described. Seal 604 has the same features as seal 104, except, in this example key 145 is absent and seal 604 includes two protective plates 610 that extend the full length of a seal member 150, parallel to axis 111. First and second actuators 106 are located on opposite sides of seal 104 within channel 108 of body 102. Ram 600 may be used together with another ram 600, forming a pair of rams, within a valve. In various other embodiments an embodiment of seal 604 includes a key 145 and the second actuator 106 of the pair is short enough so as not to interfere with key 145, or key 145 is split into sections and the actuator second actuator includes slots to slide-past the sections of key 145.

Referring again to FIG. 2 and FIG. 14, although rams, 100, 310 were described as being generally cylindrical in cross-section with respect to axis 111, in some embodiments, a ram body 102, 312 is generally rectangular, square, oval, or obround, as examples, having an outer surface that slidingly engages a similarly shaped actuator channel in a valve body. The sides of the corresponding seam member 104, 314 are similarly shaped. Similarly, referring again to FIG. 18, rather than being rectangular in cross-section with respect to axis 407, some embodiments of gate body 432 have a cross-section that is generally square, round, oval, or obround, as examples; some of these embodiments have outer surfaces 438 that are curved rather than flat. Although, various embodiments described herein include a seal assembly or a plate-backed seal with a resilient seal member bonded to a protective plate, in some embodiments, a resilient seal member is coupled to or contacts a protective plate in another way. For example, a resilient seal member may be disposed or maintained adjacent a protective plate within an assembly or may be held to a protective plate by a fastener. The protective plate is to transfer and distribute a compression force from an actuator plate to the resilient seal member.

While exemplary embodiments have been shown and described, modifications thereof can be made by one of ordinary skill in the art without departing from the scope or teachings herein. The embodiments described herein are exemplary only and are not limiting. Many variations, combinations, and modifications of the systems, apparatuses, and processes described herein are possible and are within the scope of the disclosure. Accordingly, the scope of protection is not limited to the embodiments described herein, but is only limited by the claims that follow, the scope of which shall include all equivalents of the subject matter of the claims. The inclusion of any particular method step or operation within the written description or a figure does not necessarily mean that the particular step or operation is necessary to the method. The steps or operations of a method listed in the specification or the claims may be performed in any feasible order, except for those particular steps or operations, if any, for which a sequence is expressly stated. In some implementations two or more of the method steps or operations may be performed in parallel, rather than serially.

What is claimed is:

1. Sealing apparatus comprising:
a moveable seal holder;
a cavity in the seal holder; and
a seal assembly disposed at least partially in the cavity and comprising:
  a resilient seal member including a fluid-facing end with a fluid-facing end surface;
  a first actuator plate configured to reciprocate between a first and a second position relative to a first protective plate, the first actuator plate comprising a fluid-facing end surface and a first camming surface; and
  the first protective plate disposed between the seal member and the first actuator plate;
wherein the actuator plate is configured to compress the seal member and to move the fluid-facing end surface of the seal member outward from a resting position when the actuator plate is in the second position.

2. The sealing apparatus of claim 1 wherein the seal assembly is configured such that movement of the first actuator plate from the first position toward the second position causes the first camming surface of the first actuator plate to bear against the first protective plate and to compress the resilient seal member.

3. The sealing apparatus of claim 2 wherein the seal assembly is configured such that when the first actuator plate is in the first position, the thickness of the resilient seal member at the fluid-facing end has a first thickness, and when the actuator plate is in the second position, the thickness of the resilient seal member at the fluid-facing end has a second thickness that is less than the first thickness.

4. The sealing apparatus of claim 1 wherein the cavity in the seal holder includes opposing, first and second receiving surfaces;
   wherein the seal assembly is disposed between the first and second receiving surfaces; and
   wherein the first actuator plate further comprises a second camming surface configured to engage the first receiving surface of the cavity as the first actuator plate is moved from the first position toward the second position.

5. The sealing apparatus of claim 1 wherein the fluid-facing end of resilient seal member has curved recess configured to seal against a cylindrical pipe.

6. The sealing apparatus of claim 5 further comprising:
   a BOP body having an interior surface defining a fluid passageway and being configured to receive a tubular member having a given diameter extending through the passageway;
   wherein the moveable seal holder is disposed within the BOP body and is configured to move from an open position in which the resilient seal member is spaced apart from the tubular member to a closed position in which the curved recess of the resilient seal member configured to engage sealingly the tubular member of the given diameter to prevent fluid flow through the BOP.

7. The sealing apparatus of claim 1 wherein the fluid-facing end surface of resilient seal member is concave when the first actuator plate is in the first position; and
   wherein the fluid-facing end surface of resilient seal member is convex when the first actuator plate is in the second position.

8. The sealing apparatus of claim 1 wherein, in the first position of the first actuator plate, the fluid-facing end surface of the first actuator plate extends beyond the fluid-facing end surface of the seal member; and
   wherein, in the second position of the first actuator plate, the fluid-facing end surface of the seal member extends to or beyond the fluid-facing end surface of the first actuator plate.

9. The sealing apparatus of claim 1 wherein the seal assembly further comprises a plurality of pins, each of the pins extending into a receiving slot that limits the distance the first actuator plate may travel.

10. The sealing apparatus of claim 9 wherein the pins extend from the first actuator plate, and the slots are formed in the first protective plate; and
    wherein the protective plate is bonded to the seal member.

11. The sealing apparatus of claim 9 wherein the first actuator plate further comprises:
    a body portion that is free of camming surfaces; and
    a wedge portion extending from the body portion to the fluid-facing end surface of the first actuator plate and including the first camming surface.

12. The sealing apparatus of claim 9 wherein the slots have a functional length through which the pins can move; and
    wherein the functional length of the slots is less than the camming length.

13. The sealing apparatus of claim 1 further comprising:
    a valve body having a fluid passageway therethrough; and
    a seat in the valve body configured to engage sealingly the seal member of the moveable seal holder;
    wherein the moveable seal holder is configured to move from an open position in which the resilient seal member is spaced apart from the seat to a closed position in which the resilient seal member sealingly engages the seat to prevent fluid flow through the body.

14. The sealing apparatus of claim 1 wherein the seal assembly further comprises:
    a second actuator plate comprising a camming surface; and
    a second protective plate disposed between the seal member and the second actuator plate;
    wherein the cavity in the seal holder includes opposing, first and second receiving surfaces;
    wherein the seal assembly is disposed between the first and second receiving surfaces; and
    wherein the seal assembly is configured such that movement of the second actuator plate from a first position toward a second position causes the camming surface of the second actuator plate to compress the resilient seal member by bearing against the second protective plate or against the second receiving surface of the cavity.

15. A method for sealing a fluid passageway, the method comprising:
    disposing a resilient seal member within a cavity of a moveable seal holder, the seal member extending parallel to a first axis, the seal member having a fluid-facing end surface with a resting position;
    configuring a first actuator plate to move relative to the seal member, the seal holder, and a protective plate, wherein the first actuator plate comprises a camming surface and the protective plate is disposed between the seal member and the first actuator plate;
    compressing the seal member by moving the first actuator plate; and
    causing the fluid-facing end surface of the seal member to extend outward along the first axis, beyond the seal holder and beyond the resting position.

16. The method of claim 15 wherein moving the first actuator plate involves moving it parallel to the first axis.

17. The method of claim 15 wherein the first actuator plate is configured to apply to the seal member a compression force parallel to or along a second axis that crosses the first axis.

18. The method of claim 15 wherein compressing the seal member by moving the first actuator plate includes applying an actuation force parallel to the first axis.

19. The method of claim 15 wherein the seal holder is disposed within a valve body having a flow passageway;
    wherein the seal holder is configured for movement along the first axis relative to the valve body; and
    wherein causing the fluid-facing end surface of the seal member to extend outward results in closing the flow passageway.

20. The method of claim 15 further comprising:
    disposing the first actuator plate within the seal holder along a first surface of the seal member; and
    disposing a second actuator plate within the seal holder along a second surface of the seal member;
    wherein the first and second surfaces of the seal member are parallel to the first axis; and
    wherein compressing the seal includes moving both actuator plates relative to the seal member, parallel to the first axis.

21. A sealing apparatus comprising:
    a valve body including a first axis and a fluid passageway crossing the first axis;
    a first seal holder disposed within the body, configured to reciprocate along the first axis, and comprising a cavity;

a second seal holder disposed within the body, configured to reciprocate along the first axis, and comprising a cavity, the cavity of the second seal holder facing the cavity of the first seal holder across the fluid passageway;

a first seal assembly at least partially disposed in the cavity of the first seal holder and a second seal assembly at least partially disposed in the cavity of the second seal holder, each seal assembly comprising:

a pair of protective plates, each plate having a fluid-facing end surface;

a resilient seal member between the protective plates, having a fluid-facing end surface extending between the protective plates, and having an opposite end; and an actuator plate configured to reciprocate between a first and a second position relative to the protective plates;

wherein for each seal assembly, the actuator plate is configured to compress the seal member and to extend the fluid-facing end surface of the seal member in a direction parallel to the first axis when the actuator plate is in the second position.

22. The sealing apparatus of claim 21:

wherein for each seal assembly, when the actuator plate is in the first position, the fluid-facing end surface of the seal member is in a resting position; and wherein for each seal assembly, when the actuator plate is in the second position, the fluid-facing end surface of the seal member extends beyond the resting position and beyond the fluid-facing end surfaces of the first and second protective plates and beyond the cavity of the corresponding seal holder.

23. The sealing apparatus of claim 21 further comprising a semi-circular recess extending through each seal holder and each seal assembly, the semi-circular recess aligned with the fluid passageway and crossing the first axis;

wherein the semi-circular recess configures the seal holders and seal assemblies to seal around a tubular member when the first and second seal holders to move toward each other, and the actuator plates are both in their second position.

24. The sealing apparatus of claim 21 wherein the first seal assembly and the first seal holder are configured as a first blind ram, and the second seal assembly and the second seal holder are configured as a second blind ram;

wherein the sealing apparatus is configured so that first and second blind rams contact each other to close the fluid passageway.

25. The sealing apparatus of claim 21 wherein the cavity of each seal holder includes opposing first and second receiving surfaces;

wherein for each seal assembly, the actuator plate is disposed between the protective plate and the first receiving surface of the corresponding cavity, and the actuator plate comprises a first camming surface; and wherein the seal assembly is configured such that movement of the actuator plate from the first position toward the second position causes the first camming surface to push the protective plate away from the first receiving surface and to compress the resilient seal member.

26. The sealing apparatus of claim 25 wherein for each seal assembly:

the actuator plate comprises a second camming surface;

the first camming surface of the actuator plate is configured to bear against the protective plate; and the second camming surface is configured to bear against the first receiving surface of the cavity as the actuator plate is moved from the first position toward the second position.

27. The sealing apparatus of claim 21 wherein the actuator plates of the first and second seal assemblies are configured to press against each other to achieve the second position when the first and second seal holders move toward each other.

* * * * *